US008825530B2

(12) United States Patent
Miller

(10) Patent No.: US 8,825,530 B2
(45) Date of Patent: Sep. 2, 2014

(54) TAX LIABILITY AND DEDUCTIONS VERIFICATION SYSTEM

(76) Inventor: Chevine Arthur Miller, Plainfield, NJ (US)

(*) Notice: Subject to any disclaimer, the term of this patent is extended or adjusted under 35 U.S.C. 154(b) by 274 days.

(21) Appl. No.: 13/272,196

(22) Filed: Oct. 12, 2011

(65) Prior Publication Data

US 2012/0036053 A1    Feb. 9, 2012

Related U.S. Application Data

(63) Continuation-in-part of application No. 11/761,305, filed on Jun. 11, 2007, now abandoned.

(51) Int. Cl.
*G06Q 30/00* (2012.01)
*G06Q 50/00* (2012.01)
*G06Q 40/00* (2012.01)
*G06Q 40/02* (2012.01)

(52) U.S. Cl.
CPC .............. *G06Q 40/02* (2013.01); *G06Q 40/123* (2013.12); *G06Q 40/10* (2013.01)
USPC .................... 705/15; 705/18; 705/19; 705/30; 705/31; 707/802

(58) Field of Classification Search
CPC ... G06Q 20/207; G06Q 40/103; G06Q 40/10; G06Q 10/10; G06F 17/30286
USPC ............................ 705/18, 19, 30, 31; 707/802
See application file for complete search history.

(56) References Cited

U.S. PATENT DOCUMENTS

| | | | | |
|---|---|---|---|---|
| 5,899,991 A * | 5/1999 | Karch | ........................... | 707/694 |
| 6,473,741 B1 * | 10/2002 | Baker | ........................... | 705/31 |
| 7,188,083 B2 * | 3/2007 | Agee et al. | ...................... | 705/31 |
| 7,234,103 B1 * | 6/2007 | Regan | ........................... | 715/234 |
| 2001/0037268 A1 * | 11/2001 | Miller | ............................. | 705/31 |
| 2001/0044734 A1 * | 11/2001 | Walker et al. | ..................... | 705/4 |
| 2002/0111888 A1 * | 8/2002 | Stanley et al. | .................. | 705/31 |
| 2003/0233296 A1 * | 12/2003 | Wagner | ............................ | 705/31 |
| 2005/0071376 A1 * | 3/2005 | Modi | ......................... | 707/104.1 |
| 2005/0080702 A1 * | 4/2005 | Modi | ............................. | 705/36 |
| 2006/0178961 A1 * | 8/2006 | Stanley et al. | .................. | 705/31 |

(Continued)

OTHER PUBLICATIONS

Poorly aimed audits Series: Editorials :[South Pinellas Edition]. (Apr. 9, 2002). St. Petersburg Times,p. 10A.*

(Continued)

*Primary Examiner* — Olusegun Goyea

(74) *Attorney, Agent, or Firm* — Ash Tankha.; Lipton, Weinberger & Husick

(57) ABSTRACT

A computer implemented method and system for verifying tax liability and tax deductions reported by taxable entities. A tax monitoring platform comprising a database management system dynamically generates one or more tax forms specific to each taxable entity based on characteristic information of the taxable entities. The tax monitoring platform acquires tax information filled into the tax forms by the taxable entities via a user interface, extracts tax elements from the tax information, and transforms the tax elements to conform to a predetermined template. The tax monitoring platform determines an association between a first taxable entity and a second taxable entity based on the tax elements of each of the taxable entities, and compares the tax elements of the first taxable entity with the tax elements of the second taxable entity based on the association using the database management system, for determining the accuracy of reporting of tax information.

18 Claims, 38 Drawing Sheets

(56) References Cited

U.S. PATENT DOCUMENTS

| | | | |
|---|---|---|---|
| 2006/0206372 A1* | 9/2006 | Carpenter et al. | 705/10 |
| 2007/0005461 A1* | 1/2007 | Lenz | 705/31 |
| 2007/0106592 A1* | 5/2007 | Messier | 705/36 T |
| 2007/0136212 A1* | 6/2007 | Carpenter et al. | 705/400 |
| 2007/0244774 A1* | 10/2007 | Deibler | 705/30 |
| 2007/0261114 A1* | 11/2007 | Pomerantsev | 726/12 |
| 2008/0005024 A1* | 1/2008 | Kirkwood | 705/50 |
| 2008/0021799 A1* | 1/2008 | Blowers | 705/30 |
| 2008/0082432 A1* | 4/2008 | Baker | 705/31 |
| 2008/0147494 A1* | 6/2008 | Larson | 705/14 |
| 2008/0263058 A1* | 10/2008 | Peden | 707/10 |
| 2008/0306843 A1* | 12/2008 | Miller | 705/30 |
| 2010/0161460 A1* | 6/2010 | Vroom et al. | 705/31 |
| 2012/0036053 A1* | 2/2012 | Miller | 705/31 |

OTHER PUBLICATIONS

Poorly aimed audits series: Editorials. (Apr. 9, 2002). St. Petersburg Times Retrieved from http://search.proquest.com/docview/263760498?accountid=14753.*

How to verify that a new employee is eligible to work. (2002). Wage—Hour Compliance Report, 10(7), 12-14. Retrieved from http://search.proquest.com/docview/201457215?accountid=14753.*

Tara Malone Daily Herald,Staff Writer. (May 18, 2006). Group: No contracts for illegals. Daily Herald Retrieved from http://search.proquest.com/docview/313124160?accountid=14753.*

* cited by examiner

FORM L-4 Notification of Tenants 2007

1. Legal name of business or homeowner:
2. Employer Identification Number / Social Security Number:
3. Address of Owner:
4. Address of rental property:
5. Number of apartments for rental property:

| Name of Tenant | Address | Social Security Number | Monthly Rent | Start Date | End Date |
|---|---|---|---|---|---|
| | | | | | |
| | | | | | |
| | | | | | |
| | | | | | |
| | | | | | |
| | | | | | |
| | | | | | |
| | | | | | |

FIG. 1

| Tenant's Name | Tenant's Address | Monthly Payments | Annual Payment |
|---|---|---|---|
| | | | |
| | | | |
| | | | |
| | | | |
| | | | |

FIG. 2

Form V-2 Summary of Vendor Payments 2007
1. Name of landlord or homeowner
2. Address of rental property
3. Summarize payments to vendors

| Vendor's EIN | Customer ID Number | Description of services | Payment |
|---|---|---|---|
| | | | |
| | | | |
| | | | |
| | | | |
| | | | |
| | | | |

FIG. 3

| Form C-2 Summary of Customer Payments 2007 ||||
|---|---|---|---|
| 1. Name of Vendor ||||
| 2. Address of Vendor ||||
| 3. Summarize payments to vendors ||||
| Vendor's EIN | Customer ID Number | Description of services | Revenue |
|  |  |  |  |
|  |  |  |  |
|  |  |  |  |
|  |  |  |  |
|  |  |  |  |
|  |  |  |  |

FIG. 4

ReportedTenantsByLandlord — 906

| | |
|---|---|
| PK, FK1, FK2<br>PK, FK1, FK2<br>PK, FK2<br>PK<br>PK | taxYear<br>landlordTaxId<br>propertyId<br>apartmentUnit<br>tenantTaxId |
| | tenantFirstName<br>tenantMiddleName<br>tenantLastName<br>leaseStartDate<br>leaseEndDate<br>tenantGrossIncome |

FIG. 9B

IndividualFiler — 907

| | |
|---|---|
| PK<br>PK<br>PK | taxYear<br>taxId<br>propertyId |
| | firstName<br>middleName<br>lastName<br>apartmentUnit<br>ownRentalProperty<br>isBusinessTaxId<br>isTenant<br>grossIncome |

FIG. 9C

| TableName | BusinessFiler | BusinessTransaction |
|---|---|---|
| BusinessFiler | Each row contains information about a business that has filed a tax return for a specific year. | Each business has the responsibility of reporting financial transactions between business filers and individual filers. Each business transaction must have valid tax ids and the cross checking of the financial data must match. |
| BusinessTransaction | For each tax identification number in BusinessFiler, all the business transactions can be retrieved from BusinessTransaction. | Each row represents a financial transaction between two business filer database entities for a specific year. Information, such as tax ids and financial data can be cross checked to confirm the data. |
| DiscrepancyType ExternalDiscrepancy | If an external agency has found a discrepancy with a business filer, the business filer will have a row for each discrepancy. | N/A |
| HouseholdUnit | For each person in a household, the tax identification number is used to retrieve information from BusinessFiler. | The tax id that has been reported by an external agency can be used to retrieve information about the financial transactions for that tax id. |
| | | For each tax id that exists in a household, the database entity BusinessTransaction can be used to search for financial transactions. |

FIG. 10A

| TableName | BusinessFiler | BusinessTransaction |
|---|---|---|
| IndividualFiler | The tax identification number can be used to join these two database entities. | The tax id in IndividualFiler can be used to retrieve information about financial transactions. |
| Landlord | If a business own rental property, a row is found in the database entity Landlord | For a tax id in Landlord, information can be retrieved about the financial transactions that have been reported. |
| Property | If a business filer owns rental property, its tax id can be used to find all the rental income that was reported by a business. | The tax id in Property can be used to retrieve financial transactions that a landlord has been involved in. |
| PropertyDescription | The join between these two database entities are taxYear and propertyId. It is the primary address for the business filer. | The tax ids in PropertyDescription can be used to retrieve all the financial transactions that have been associated to a landlord. |
| PropertyType | N/A | N/A |
| ReportedTenantsByLandlord | If a business filer owns rental property, its tax id can be used to retrieve information from the database entity ReportedTenantsByLandlord | The tax ids for the landlord and the tenants can be used to identify any financial transactions that have been reported in the database entity BusinessTransaction |

FIG. 10B

| TableName | BusinessFiler | BusinessTransaction |
|---|---|---|
| SourceSystem | N/A | N/A |
| TransactionType | N/A | The column transactionType is used to join these two database entities. It is used to obtain description name from TransactionType |

FIG. 10C

| TableName | DiscrepancyType | ExternalDiscrepancy |
|---|---|---|
| BusinessFiler | N/A | The taxId can be used to retrieve all the external discrepancies that have been reported for a business filer. |
| BusinessTransaction | N/A | The taxid can be used to retrieve any external discrepancies for tax ids that have been involved in reported financial transactions. |
| DiscrepancyType | Each row describes a type of discrepancy that can be detected by the auditing system or a discrepancy that has been reported by an external agency. | In ExternalDiscrepancy, the value for discrepancyTypeId is used to retrieve the description from the database entity DiscrepancyType. |
| ExternalDiscrepancy | In ExternalDiscrepancy, the value for discrepancyTypeId is used to retrieve the description from the database entity DiscrepancyType. | Each row contains a discrepancy that has been reported by an external agency, e.g. Social Security, Department of Motor Vehicles. |
| HouseholdUnit | N/A | The tax identification number from ExternalDiscrepancy to locate the household unit for that tax id in HouseHoldUnit. |
| IndividualFiler | N/A | The tax identification number from ExternalDiscrepancy to locate additional information about the tax filer in IndividualFiler. |

FIG. 10D

| TableName | DiscrepancyType | ExternalDiscrepancy |
|---|---|---|
| Landlord | N/A | The tax id from Landlord is used to retrieve any discrepancies that were reported by external agencies in the database entity ExternalDiscrepancy |
| Property | N/A | The tax identification number in Property is used to retrieve any discrepancies that have been reported by external agencies in ExternalDiscrepancy. |
| PropertyDescription | N/A | N/A |
| PropertyType | N/A | N/A |
| ReportedTenantsByLandlord | N/A | For each tenant that was reported by a landlord in ReportedTenantsByLandlord, the tax identification number is used to determine if that individual has any discrepancies that were reported by an external agency. |
| SourceSystem | N/A | N/A |
| TransactionType | N/A | N/A |

FIG. 10E

| TableName | HouseholdUnit |
|---|---|
| BusinessFiler | The tax id in BusinessFiler can be used to identify a business filer that has received rental income from a household. |
| BusinessTransaction | The tax ids in a business transaction can be used to retrieve information with the tax ids that have been provided in the database entity HouseHoldUnit. |
| DiscrepancyType | N/A |
| ExternalDiscrepancy | For each discrepancy that was reported by an external agency, the tax identification number is used to locate the household unit for that individual. |
| HouseholdUnit | Each row identifies information about an individual that has lived in that household for a specific tax filing year. |
| IndividualFiler | Each tax filer has to report all the individuals, e.g. dependants and non-dependants that have lived at that residence for the tax year. |
| Landlord | For each landlord tax id that has been reported in HouseHoldUnit, additional information about the landlord can be retrieve from Landlord. |
| Property | The natural join between these two database entities are taxYear and propertyId. |
| PropertyDescription | The natural join between these two tables are the columns taxYear and propertyId. For each property in PropertyDescription, all the household units can be found in the database entity HouseHoldUnit. |
| PropertyType | N/A |
| ReportedTenantsByLandlord | The following attributes are used to associate information between two database entities: tax year, tax identification numbers, and property id. Since the information was reported by individual filers in HouseHoldUnit and the information for ReportedTenantsByLandlord was reported by landlords, these attributes are used to confirm some of the information that was provided by both taxable entities. |
| SourceSystem | N/A |
| TransactionType | N/A |

FIG. 10F

| TableName | IndividualFiler | Landlord |
|---|---|---|
| BusinessFiler | The tax identification number can be used to join these two database entities. | If a business own rental property, a row is found in the database entity Landlord |
| BusinessTransaction | The tax identification number from IndividualFiler can be used to determine if the tax filer was involved in any business transactions. | The tax identification number from Landlord is used to retrieve all the business transactions from Business Transaction. |
| DiscrepancyType | N/A | N/A |
| ExternalDiscrepancy | The tax identification number from IndividualFiler can be used to determine if the tax filer was reported to have any discrepancies by an external agency. | The tax identification number from Landlord is used to retrieve all the discrepancies that have been reported by external agencies. |
| HouseholdUnit | The tax identification number from Individual Filer is used to identify all the households where it has been reported for a tax year. | The tax identification number from Landlord is used to locate information about the landlord as a member of a household and where tenants have identified a landlord. |
| IndividualFiler | Each row contains information about a tax filer for a specific tax year. | The tax identification number is used to join these two database entities. |
| Landlord | The tax identification number is used to join these two database entities. | Each row contains information about an individual that has rental income. |
| Property | The natural join between these two database entities is the tax identification number. For an individual filer, information can be retrieved from the database entity Property | For each landlord in Landlord, the tax identification number uses the tax identification number to retrieve all the rental property for the landlord. |

FIG. 10G

| TableName | IndividualFiler | Landlord |
|---|---|---|
| PropertyDescription | The natural join between these two database entities are the attributes tax identification number and propertyId. Information about the individual tax filer's primary residence can be retrieved. | For each landlord in Landlord, the tax identification number uses the propertyId attribute to determine the primary residence for each year. |
| PropertyType | N/A | N/A |
| ReportedTenantsByLandlord | The tax identification number in IndividualFiler can be used to determine if the individual is a landlord, a tenant, or both by retrieving information from ReportedTenantsByLandlord. | For each landlord in Landlord, the tax identification number is used to retrieve information about the tenants that the landlord has reported to a tax monitoring platform. |
| SourceSystem | N/A | N/A |
| TransactionType | N/A | N/A |

FIG. 10H

| TableName | Property | | PropertyDescription |
|---|---|---|---|
| BusinessFiler | With the tax identification number and the tax Year, all the property for a business can be found. | N/A | |
| BusinessTransaction | With the tax identification number and tax Year from Property, all the business transactions can be found for that tax identification number. | N/A | |
| DiscrepancyType | N/A | N/A | |
| ExternalDiscrepancy | For each external discrepancy that has been reported, the tax identification number can be used to retrieve all the properties that belong to that tax identification number. | N/A | |
| HouseHoldUnit | The natural join between these two tables are the attributes taxYear and propertyId. For each property in PropertyDescription, all the household units can be found in the database entity HouseHoldUnit. Also, for each member of a household unit, the tax identification number can be used to retrieve information about where and when a person had resided. | | The natural join between these two tables are the columns taxYear and propertyId. For each property in PropertyDescription, all the household units can be found in the database entity HouseHoldUnit. |
| IndividualFiler | For each tax identification number in IndividualFiler, the property id attribute is used to locate the primary resident for the individual in the database entity Property | | The natural join between these two tables are the columns taxYear and propertyId. For each property in PropertyDescription, all the individual filers can be found in the database entity IndividualFiler. |

FIG. 10I

| TableName | Property | PropertyDescription |
|---|---|---|
| Landlord | For each tax identification number in IndividualFiler, the property id attribute is used to locate the primary resident for the landlord in the database entity Property. | The natural join between these two database entities are the columns taxYear and propertyId. It defines the primary residence for a landlord. |
| Property | Each row contains information about rental income that has been received for each apartment in a specific tax year. | The natural join for these two database entities are the columns taxYear and propertyId. The primary relationship is to associate a property to landlord and the rental income for that property. |
| PropertyDescription | The natural join for these two database entities are the columns taxYear and propertyId. The primary relationship is to associate a property to landlord and the rental income for that property. | Each row provides information about the property that was provided by the landlord for a specific year. |
| PropertyType | N/A | N/A |
| ReportedTenantsByLandlord | The primary attributes that are used to associate information between these two database entities are tax year, landlord identification number and property id. For each landlord, all the tenants that have been identified are identified. | One of the natural joins is with the columns taxYear and propertyId. With this join, all the tenants and the landlord can be determined. |
| SourceSystem | N/A | N/A |
| TransactionType | N/A | N/A |

FIG. 10J

| TableName | ReportedTenantsByLandlord |
|---|---|
| BusinessFiler | The tax id in BusinessFiler is used to retrieve information about tenants that lease property from the business. |
| BusinessTransaction | The tax ids for the landlord and the tenants can be used to identify any financial transactions that have been reported in the database entity BusinessTransaction. |
| DiscrepancyType | N/A |
| ExternalDiscrepancy | The tax identification numbers from ExternalDiscrepancy to locate information about landlords that have reported tenants or tenants that have been reported by landlords. |
| HouseholdUnit | The following attributes are used to associate information between these two database entities: tax year, tax identification numbers, and property id. Since the information was reported by individual filers in HouseHoldUnit and the information for ReportedTenantsByLandlord was reported by landlords, these attributes are used to confirm some of the information that was provided by both taxable entities. |
| IndividualFiler | The tax identification number in IndividualFiler can be used to determine if the individual is a landlord, tenant, or both by retrieving information from ReportedTenantsByLandlord |
| Landlord | For each landlord in Landlord, the tax identification number is used to retrieve information about the tenants that the landlord has reported to the tax monitoring platform |
| Property | The primary attributes that are used to associate information between these two database entities are tax year, landlord identification number and property id. For each landlord, all the tenants that have been identified by the landlord are identified. |
| PropertyDescription | One of the natural joins is with the columns taxYear and propertyId. With this join, all the tenants and the landlord can be determined. |
| PropertyType | N/A |

FIG. 10K

| TableName | ReportedTenantsByLandlord |
|---|---|
| ReportedTenantsByLandlord | The landlord has to report all the residents that occupy an apartment unit. Each row represents information about a resident reported by a landlord in the specified tax year. |
| SourceSystem | N/A |
| TransactionType | N/A |

FIG. 10L

| TableName | PropertyType | SourceSystem | TransactionType |
|---|---|---|---|
| BusinessFiler | N/A | N/A | N/A |
| BusinessTransaction | N/A | N/A | N/A |
| DiscrepancyType | N/A | N/A | N/A |
| ExternalDiscrepancy | N/A | The attribute sourceSystemId is used to locate all the discrepancies that have been reported by an external agency. | N/A |
| HouseholdUnit | N/A | N/A | N/A |
| IndividualFiler | N/A | N/A | N/A |
| Landlord | N/A | N/A | N/A |
| Property | N/A | N/A | N/A |
| PropertyDescription | For each property, propertyDescription is used to obtain a description for the property. | | |
| PropertyType | Each row represents a general description for a type of property that is taxable. | N/A | N/A |
| ReportedTenantsByLandlord | N/A | N/A | N/A |
| SourceSystem | N/A | Each row represents an external agency that the tax monitoring platform provides data to and/or receives information from. | N/A |
| TransactionType | N/A | N/A | Each row represents a type of financial transaction that exists between two tax filers. |

FIG. 10M

```
select l.taxYear, l.taxId, p.propertyId, p.rentalIncomeReceived, p.apartmentunit,
hhu.taxid ,sum(hhu.totalRentalPaidByResident)
from LANDLORD as l
, PROPERTY as p left outer join HouseHoldUnit as hhu with(nolock) on (
p.propertyId = hhu.propertyId and p.taxYear = hhu.taxYear)
where l.taxYear = p.taxYear
and l.taxId = p.landlordTaxId
group by l.taxYear, l.taxId, p.propertyId, p.rentalIncomeReceived,
p.apartmentunit, hhu.taxid
having p.rentalIncomeReceived != SUM(hhu.totalRentalPaidByResident) or
SUM(hhu.totalRentalPaidByResident) is null
order by p.propertyId, l.taxYear, l.taxId, p.rentalIncomeReceived,
p.apartmentunit,hhu.taxid
```

FIG. 11A

| taxYear | taxId | propertyId | tenantTaxId | apartmentUnit | firstName | lastName | relationship | totalRentalPaidByResident | startLeaseDate | endLeaseDate | taxDependant | landlordTaxId |
|---|---|---|---|---|---|---|---|---|---|---|---|---|
| 2011 | 2001 | 1 | 2001 | 2001 | Will | Godwin | SELF | 2500 | 1/1/2011 0:00 | 12/31/2011 0:00 | N | NULL |
| 2011 | 2001 | 1 | 2001A | 2001 | Mary | Godwin | CHILD | 0 | 1/1/2011 0:00 | 12/31/2011 0:00 | Y | NULL |
| 2011 | 2001 | 1 | 2001B | 2001 | Marsha | Godwin | CHILD | 0 | 1/1/2011 0:00 | 12/31/2011 0:00 | Y | NULL |
| 2011 | 2001 | 1 | 2001C | 2001 | Percy | Shelley | FRIEND | 1000 | 1/1/2011 0:00 | 12/31/2011 0:00 | N | NULL |
| 2011 | 3301 | 2 | 3301 | 3301 | Alfred | Tenny | SELF | 30000 | 1/1/2011 0:00 | 12/31/2011 0:00 | N | 2222222 2 |

FIG. 11B

| tax Year | taxId | propertyId | firstName | lastName | apartment Unit | ownRental Property | isTenant | grossIncome | isBusiness TaxId |
|---|---|---|---|---|---|---|---|---|---|
| 2011 | 111111111 | 1 | John | Smith | 2001 | Y | N | NULL | NULL |
| 2011 | 222222222 | 2 | Mary | Miller | 2001 | Y | N | NULL | NULL |
| 2011 | 333333333 | 3 | Marsha | Jones | 2001 | Y | N | NULL | NULL |

FIG. 11C

| taxYear | landlordTaxId | propertyId | percentageOwned | rentalIncomeReceived | apartmentUnit | numberOfPropertyOwners |
|---|---|---|---|---|---|---|
| 2011 | 111111111 | 1 | 50 | $5000 | 2001 | NULL |
| 2011 | 222222222 | 1 | 25 | $2500 | 2001 | NULL |
| 2011 | 222222222 | 2 | 100 | $20000 | 3001 | NULL |
| 2011 | 333333333 | 1 | 25 | $2500 | 2001 | NULL |
| 2011 | 333333333 | 3 | 100 | $30000 | 100 | NULL |

FIG. 11D

| taxYear | taxId | propertyId | rentalIncomeReceived | apartmentUnit | taxId | Sum(totalRentalPaidByResident) |
|---|---|---|---|---|---|---|
| 2011 | 111111111 | 1 | $8000 | 2001 | 2001 | $3300 |
| 2011 | 222222222 | 1 | $2500 | 2001 | 2001 | $3800 |
| 2011 | 333333333 | 1 | $2500 | 2001 | 2001 | $3500 |
| 2011 | 222222222 | 2 | $20000 | 3301 | 3301 | $30000 |
| 2011 | 333333333 | 3 | $30000 | 100 | NULL | NULL |

FIG. 11E

```
select b1.businessName, bt1.transactionId, tt1.transactionDescription,
bt1.transactionAmount , bt1.customerTaxId, bt2.transactionAmount
from BUSINESSFILER as b1,
TRANSACTIONTYPE as tt1,
BUSINESSTRANSACTION as bt1 left join BUSINESSTRANSACTION
as bt2 with(nolock) on (bt1.transactionId = bt2.transactionid and
bt1.taxYear = bt2.taxYear and bt1.customerTaxId = bt2.taxId and
bt1.transactionType != bt2.transactionType)
where b1.taxYear = bt1.taxYear
and b1.taxId = bt1.taxid
and ((bt2.transactionAmount is null) or (bt1.transactionAmount !=
bt2.transactionAmount))
and bt1.transactionType = tt1.transactionType
order by bt1.transactionAmount,bt1.taxYear,bt1.taxId,bt1.transactionId
```

FIG. 11F

| taxYear | taxId | businessName | city | state | grossIncome | totalDeduction | totalTaxCredits | propertyId |
|---|---|---|---|---|---|---|---|---|
| 2011 | b1 | b1 | NYC | NY | NULL | NULL | NULL | NULL |
| 2011 | b2 | b2 | ATLANTA | GA | NULL | NULL | NULL | NULL |

FIG. 11G

| taxYear | taxId | transactionId | transactionType | transactionAmount | customerTaxId |
|---|---|---|---|---|---|
| 2011 | b1 | 1 | 1 | $10000 | b2 |
| 2011 | b1 | 3 | 1 | $30000 | b2 |
| 2011 | b4 | 4 | 1 | $15000 | b2 |
| 2011 | b1 | 5 | 1 | $15000 | b2 |
| 2011 | b1 | 6 | 1 | $8000 | b2 |
| 2011 | b2 | 1 | 2 | $10000 | b4 |
| 2011 | b2 | 2 | 1 | $20000 | b1 |
| 2011 | b2 | 4 | 1 | $15000 | b1 |
| 2011 | b2 | 5 | 2 | $7500 | b1 |
| 2011 | b2 | 6 | 2 | $8000 | b1 |

FIG. 11H

| transactionType | transactionDescription |
|---|---|
| 1 | buy |
| 2 | sell |

FIG. 11I

| businessName | transactionId | transactionDescription | transactionAmount | customerTaxId | transactionAmount |
|---|---|---|---|---|---|
| b2 | 5 | SELL | $7500 | b1 | $15000 |
| b1 | 4 | BUY | $15000 | b2 | NULL |
| b1 | 5 | BUY | $15000 | b2 | $7500 |
| b2 | 4 | BUY | $15000 | b1 | NULL |
| b2 | 2 | BUY | $20000 | b1 | NULL |
| b1 | 3 | BUY | $30000 | b2 | NULL |

TENANT APPLICATION FORM 7777

Landlord/Owner Name _____ Account Number: _____
Rental Property Address _____
Standard Services        Rental Amount: $ _____
☐ National Credit Single   ☐ National Credit Married   ☐ Tenant Pay Form Attached
Additional Services (per applicant)   ☐ National Sex Offender Search
☐ State of FL criminal   ☐ State of ------ criminal   ☐ National Criminal I/We hereby allow TENANT CHECK and TENANT SCREENING NOW and/or the property owner/manager to inquire into my/our credit file, criminal, rental and employment history. I/We understand that on my/our credit file it will appear that TENANT CHECK and TENANT SCREENING NOW has made an inquiry. I/We cannot claim any invasion of privacy against them now or in the future. If an incorrect SS# is submitted applicant will be subjected to a second application fee.

| Applicant | Co-Applicant |
|---|---|
| ☐ Single ☐ Married<br>☐ Married to co-applicant<br>SS# _____<br>Full Name _____<br>Date of Birth _____<br>Current Address _____<br><br>PH # _____<br>Landlord Name _____<br>Landlord # _____ Rent$ _____<br>Employer _____<br>Occupation _____<br>Supervisor _____<br>How long _____ Work # _____<br>Gross Monthly Income $ _____<br>(before tax)<br>Monthly debt (loans/ car payment) _____<br>Collections on your credit report?  ☐ Yes ☐ No<br>Late payments on your credit report?  ☐ Yes ☐ No<br>Evictions? ☐ Yes ☐ No (Year ___)<br>Ever been arrested  Yes   No<br>DL # _____ (State ____)<br>Signature _____ | ☐ Spouse ☐ Roommate   OR<br>☐ Co-Signer<br>SS# _____<br>Full Name _____<br>Date of Birth _____<br>Current Address _____<br><br>PH # _____<br>Landlord Name _____<br>Landlord # _____ Rent$ _____<br>Employer _____<br>Occupation _____<br>Supervisor _____<br>How long _____ Work # _____<br>Gross Monthly Income $ _____<br>(before tax)<br>Monthly debt (loans/ car payment) _____<br>Collections on your credit report?  ☐ Yes ☐ No<br>Late payments on your credit report?  ☐ Yes ☐ No<br>Evictions? ☐ Yes ☐ No (Year ___)<br>Ever been arrested  Yes   No<br>DL # _____ (State ____)<br>Signature _____ |

FIG. 12B

TAX LIABILITY AND DEDUCTIONS VERIFICATION SYSTEM

CROSS REFERENCE TO RELATED APPLICATIONS

This is a continuation-in-part application of non-provisional patent application Ser. No. 11/761,305, titled "Cost effective methods to reduce tax avoidance by landlords, small businesses, and individuals" filed on Jun. 11, 2007, now abandoned in the United States Patent and Trademark Office.

The specification of the above referenced application is incorporated herein by reference in its entirety.

BACKGROUND

The computer implemented method and system disclosed herein, in general, pertains to developing cost effective methods that can be implemented by tax collection agencies to verify tax revenues for individuals, landlords, and businesses. Furthermore, the computer implemented method and system disclosed herein lays the foundation for allowing government agencies to build a centralized database to determine who resides in a country.

Typically, individual tax payers and businesses do not provide sufficient information to determine whether they are complying with tax laws. Unless each individual tax payer, landlord and business is audited, cost effective methods do not exist to identify fraudulent tax returns and or to ensure that individuals, landlords, and businesses are in compliance with tax laws.

Historically, tax collection agencies rely upon individuals and businesses to accurately report income and deductions. Since tax collection agencies depend upon the honor system for certain individuals and businesses to report their taxable revenues and expenses, information that is required to verify some of this information may not be easily available. Landlords, tax evaders, and general contractors are notorious for not reporting all their taxable income. Since landlords know that tenants do not report their monthly rental payments, some landlords know that they can probably underreport some or all their rental income. To reduce the amount of money that has to be reported for a work project, some contractors ask landlords to pay for part of the work project with cash. If a contractor receives cash, he may be tempted not to report that income. Since tax collection agencies do not have the manpower or the tools to verify the deductions for landlords, some landlords may attempt to claim fraudulent business deductions.

Unless an individual or a business is audited and investigated, a tax collection agency does not know whether or not the income and deductions are accurate. Since tax collection agencies do not have the resources to audit every tax return, the possibility exists that individuals and businesses may submit fraudulent claims knowing that tax collection agencies may not be able to audit or verify their tax returns. For example, in fiscal year 2006, the internal revenue service (IRS) was only able to audit 257,000 individuals with incomes over $100,000 and to audit 17,015 individuals with incomes over $1,000,000.

As a landlord, the landlord simply has to state the amount of rental income for each rental property in his/her tax return forms. Tenants do not have a way of reporting to a tax collection agency their payments to landlords. Since a mechanism does not exist to verify the rental income that has been reported by landlords, the possibility exists that some landlords may intentionally underreport rental income. Since many individuals know that tax collection agencies cannot easily identify them or since employers will not report employees that are not officially on their payrolls, many tax avoiders do not feel compelled to comply with the tax law.

One of the biggest deductions for landlords involves renovations and repairs for rental properties. Even though landlords report that payments were made for these repairs and renovations, cost effective methods do not exist to confirm that the landlords have actually paid for these services. Basically, tax collection agencies rely upon landlords for accurate reporting for such payments.

Under the existing taxation system, tax collection agencies assume that every business will file a W-2 form for each employee and every eligible individual receives a W-2 form. If a business submits a W-2 form for an employee and the employee does not file a tax return, the tax collection agency should detect the non-filing as a problem. If an employee files a tax return and the employer does not submit a W-2 form for the employee, the tax collection agency should detect this as a problem with the employee or the employer. However, if the employee does not file a tax return and the employer does not submit a W-2 form for the employee, it is highly likely that tax collection agencies would not be able to detect the non-compliance of the employer and the employee with the tax law.

When a house is placed into service as a rental property, tax collection agencies rely upon landlords to provide a brief description of the rental property. In certain localities, landlords have been known to convert dwellings into illegal housing. Many communities complain that landlords convert single family and multi-family houses into boarding houses. Some of the landlords even convert basements and attics into illegal apartments. Since tax collection agencies do not have the ability to confirm the actual number of apartments at rental properties, the possibility exists that landlords do not report all the income for apartments on a rental property. To allow tax collection agencies to collect all the tax revenues that are due on a rental property, there is a need for identifying all the individuals and businesses that are failing to comply with the tax laws.

Individuals and businesses avoid complying with the tax laws by "working off the books" or by using another person's tax identification number. If that person is "working off the books", or resides in the country illegally, the probability is very high that tax collection agencies are not aware of that person and the employer who is not accurately reporting revenue.

Another problem for tax collection agencies arises from landlords who do not accurately report deductions and vendors who do not accurately report revenues generated in the housing industry. With the existing taxation system, landlords state the expenses that were paid to vendors, for example, general contractors, plumbers, electricians, landscapers, etc. Unless audited, landlords are not required to submit any type of proof of income received or expenses on a tax return. It is possible that a landlord could claim a deduction for a business that did not provide any type of service, or the claimed deduction could be more than what the landlord or homeowner paid for the service. Unless a landlord's tax return is audited, tax collection agencies are not able to confirm that a landlord's deductions are accurate. Since a very small percentage of tax returns are audited and landlords know that their chances of being audited are small, the probability of unscrupulous landlords providing inaccurate information is high.

Another problem for tax collection agencies arises from vendors, for example, general contractors, plumbers, electricians, etc., who do not accurately report all their revenue from the home construction and renovation industry. Under the existing taxation system, a vendor needs to state the vendor's revenue and business expenses. However, enough information is not provided on the tax returns to confirm revenues and expenses. Unless a vendor is audited, a vendor does not have to provide any details on how the revenue was generated. Since the probability of facing an audit is very low, the vendor may choose to underreport the revenue from some or all of the vendor's jobs.

The major responsibility of the census bureau is to enumerate the population of a country periodically. For example, the United States census bureau enumerates the population of the United States every 10 years. The results of the enumeration are used to determine the allocation of congressional seats allowed for a state in the House of Representatives, the distribution of electoral votes, the distribution of funds for government programs, etc. In the past, many states and communities have complained that the results of the enumeration were not accurate. One of the reasons for the complaints is that census enumerators may not have been aware of illegal apartments or the number of people at a dwelling.

Typically, tax collection agencies verify taxes manually, on paper. However, traditional methods of paper documentation have been found to be inadequate, unreliable and prone to manipulation by the tax payers as well as the tax collection agencies. Moreover, a manual verification of tax information carried out by the tax collection agencies opens the possibility of transcription and evaluation errors by tax examiners of the tax collection agencies. Furthermore, the existing taxation system does not allow quick and efficient collection of tax information from tax payers. The speed of processing and evaluation of the tax information is impeded by the great volume of information that needs to be processed. Moreover, if the tax examiners find discrepancies in the tax information submitted by the tax payers, there is a substantial delay in notifying the tax payers, which may be followed by delays in subsequently receiving a clarification or requests to correct errors in the submitted tax information, etc.

Conventional tax forms, for example, the Minnesota property tax form, for verifying information declared on a property by a tax payer, examine the tax information collectively for an entire household unit. This collective examination allows the possibility of manipulation of the tax information by the tenants and the landlords, for example, by reporting only a partial income or payment. Further, this collective examination may limit accurate population count estimation, and per capita income estimation, since the tax information is generally considered as an important input for completing population count estimation.

Moreover, conventional tax forms provide static interfaces and formats that are designed with a fixed set of fields that mandate all tax payers to report tax information in accordance with the requirements set by the fields. Some of the tax information requested from the tax payer may not be relevant or applicable to a specific tax payer since the tax information may not be applicable to the financial or demographic profile of the tax payer. This results in additional processing of redundant tax information that is uneconomical, slow, and places an unwarranted burden on both the tax payer and the tax collection agencies.

Hence, there is a long felt but unresolved need for a computer implemented method and system that verifies tax liability and tax deductions reported by taxable entities, for example, tax payers in a secure electronic environment. Moreover, there is a need for a computer implemented method and system that systematically organizes tax information and allows speedy access of the tax information from a database. Furthermore, there is a need for a computer implemented method and system that determines associations between taxable entities, performs electronic verification of tax information reported by each of the taxable entities, notifies the taxable entities of errors found in the tax information, in addition to allowing the taxable entities to update the tax information if there are errors in the tax information. Furthermore, there is a need for a computer implemented method and system that dynamically generates tax forms based on the financial or demographic profiles of the taxable entities.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above mentioned need for verifying tax liability and tax deductions reported by one or more taxable entities, for example, tax payers, in a secure electronic environment. The computer implemented method and system disclosed herein systematically organizes tax information and allows speedy access of the tax information from a database. The database can be used to provide vital information to government agencies. Furthermore, the computer implemented method and system disclosed herein determines associations between taxable entities, performs electronic verification of tax information reported by each of the taxable entities, notifies the taxable entities in the event of errors found in the tax information, in addition to allowing the taxable entities to update the tax information if there are errors in the tax information. Furthermore, the computer implemented method and system disclosed herein dynamically generates one or more tax forms specific to each of the taxable entities based on the financial or demographic profiles of the taxable entities.

A computer implemented method and system for verifying tax liability and tax deductions reported by taxable entities is provided. As used herein, the term "taxable entity" refers to an individual or an organization that is liable to pay tax to the government of a country, for example, for income earned on a taxable object, transactions such as transfers and sales of taxable objects, etc. The taxable entity is, for example, an individual eligible to pay tax, a business organization, an owner of a taxable object, a user of a taxable object, etc. Also, as used herein, the term "taxable object" refers to a property, a commodity, a product, a service, an activity, etc., that is subjected to business transactions, generation of revenue or income or a tangible benefit to the taxable entities associated with the taxable object, and that is taxable by the government of a country. The computer implemented method and system disclosed herein provides a tax monitoring platform accessible by multiple taxable entities over a network, via a user interface provided by the tax monitoring platform. The tax monitoring platform comprises a database management system for storing, managing, and retrieving information on the tax liability and the tax deductions reported by the taxable entities.

The tax monitoring platform dynamically generates one or more tax forms specific to each of the taxable entities based on characteristic information of the taxable entities retrieved, for example, from multiple third party databases via the network. As used herein, the term "characteristic information" refers to information that uniquely identifies or characterizes a taxable entity in a country, and that specifies demographics, for example, age, home ownership, employment status, income, etc., of the taxable entity. The tax monitoring platform utilizes the characteristic information to determine the tax liability of the taxable entity in the country. The third party databases are authorized external databases that store the characteristic information of the taxable entities. The tax monitoring platform establishes an agreement with the third party databases to obtain access to the characteristic information of the taxable entities from the third party databases. The tax monitoring platform dynamically generates different tax forms based on the characteristic information of the taxable entities. For example, if the tax monitoring platform determines that a taxable entity is a landlord from the characteristic information, the tax monitoring platform dynamically generates a tax form specific to the landlord. Similarly, if the tax monitoring platform determines that a taxable entity is a tenant on a landlord's property from the characteristic information, the tax monitoring platform dynamically generates a tax form specific to the tenant.

The tax monitoring platform acquires tax information filled into the dynamically generated tax forms by the taxable entities, via the user interface and stores the acquired tax information in the database management system. As used herein, the term "tax information" refers to information comprising, for example, the gross income earned by a taxable entity, tax liabilities, tax deductions for which the taxable entity is eligible, etc., that needs to be submitted by the taxable entities to a government of a country. The tax monitoring platform acquires tax information comprising, for example, one or more of the number of second taxable entities associated with a taxable object, identification information of each of the second taxable entities that contributes to the income earned by the first taxable entities from the taxable object, the relationship between the second taxable entities, relationship between the first taxable entities and the second taxable entities, dependency status of each of the second taxable entities, and payment rendered by each of the second taxable entities that contributes to the income earned by the first taxable entities, for utilization of the taxable object, etc. As used herein, the term "first taxable entity" refers to an owner of a taxable object, and the "second taxable entity" refers to an individual or an organization that utilizes or pays for the taxable object owned by the first taxable entity.

The tax monitoring platform identifies errors in the acquired tax information and notifies the taxable entities thereof, thereby allowing the taxable entities to correct the errors via the user interface. The tax monitoring platform updates the acquired tax information in the database management system on receipt of inputs from the taxable entities about change in the characteristic information of the taxable entities via the user interface. The tax monitoring platform extracts tax elements from the acquired tax information and transforms the extracted tax elements to conform to a predetermined template defined by the database management system. As used herein, the term "tax elements" refers to specific tax details in the tax information that are required for determining the tax liability of the taxable entity. The tax elements comprise, for example, one or more of a tax year, unique identification information of the taxable entities, name of each of the taxable entities, address of each of the taxable entities, income associated with each of the taxable entities, number of the second taxable entities associated with the first taxable entity, transaction information associated with a taxable object utilized by each of the taxable entities, etc. The transaction information comprises, for example, identification information for identifying the taxable object, a start date of utilization of the taxable object, an expected end date of utilization of the taxable object, income earned from the taxable object, payments rendered for utilization of the taxable object, etc.

The database management system of the tax monitoring platform configures the predetermined template for organizing the tax elements extracted from the acquired tax information of the taxable entities in the database management system. Furthermore, the database management system configures the predetermined template for enabling determination of the association between the first taxable entities and the second taxable entities, and for performing automated retrieval of the tax elements from the database management system.

In an embodiment, the tax monitoring platform receives requests for one or more tax elements extracted from the acquired tax information from one or more governing authorities via the network. The tax monitoring platform retrieves the requested tax elements from the database management system and replicates the retrieved tax elements to one or more external databases associated with the governing authorities via the network. In an embodiment, the tax monitoring platform encrypts the retrieved tax elements and transmits the encrypted tax elements to the governing authorities via the network.

In an embodiment, the tax monitoring platform transmits unique identification information of the taxable entities, extracted from the acquired tax information stored in the database management system to a census authority via the network for enabling the census authority to perform a population count operation. As used herein, the term "unique identification information" refers to information that uniquely distinguishes an individual or an organization and enables legal tracking of the individual or the organization for taxation. The unique identification information is determined by a government authority and issued to the individual or the organization.

After extracting the tax elements from the acquired tax information and transforming the extracted tax elements to conform to a predetermined template defined by the database management system, the tax monitoring platform determines an association between a first taxable entity and a second taxable entity among the taxable entities based on the extracted tax elements of each of the taxable entities using the database management system. The tax monitoring platform compares the extracted tax elements of the first taxable entity with the extracted tax elements of the second taxable entity based on the association, using the database management system, for determining accuracy of reporting of the tax information by the taxable entities. The determination of the accuracy of the reporting of the tax information by the taxable entities verifies the tax liability and the tax deductions reported by the taxable entities.

In an embodiment, the tax monitoring platform compares the income earned by the first taxable entity on a taxable object owned by the first taxable entity with the payment rendered by the second taxable entity for utilization of the taxable object using the database management system. The tax monitoring platform verifies the rendered payment reported by each second taxable entity with the income reported by the first taxable entity for each second taxable entity. The tax monitoring platform verifies an equivalence of the sum of the rendered payment reported by each second taxable entity with a sum of the income reported by the first taxable entity for each second taxable entity.

The tax monitoring platform generates a report based on the comparison that determines the accuracy of reporting of the tax information. The tax monitoring platform transmits the generated report to one or more of an authorized tax entity, governing authorities, etc. As used herein, the term "authorized tax entity" refers to a government organization or an intermediary organization associated with a government organization that collects tax forms from the taxable entities and processes the collected tax forms. In an embodiment, the tax monitoring platform transmits the generated report to the first taxable entity and the second taxable entity. The tax monitoring platform identifies discrepancies in the acquired tax information during the comparison of the extracted tax elements of the first taxable entity with the extracted tax elements of the second taxable entity. In an embodiment, the tax monitoring platform updates the generated report based on discrepancy information acquired externally, for example, from one or more of the authorized tax entity, governing authorities, etc., via the network. In an embodiment, the tax monitoring platform notifies the taxable entities on the discrepancy information.

To allow tax collection agencies to identify underreporting of income by the taxable entities, for example, individuals, landlords, vendors, etc., the tax monitoring platform ensures that tax revenues are reported accurately and lays the foundation for sharing data among different agencies.

The computer implemented method and system disclosed herein therefore ensures that landlords accurately report rental income for rental properties. In the computer implemented method and system disclosed herein, the landlords are now required to provide the name and tax identification numbers of the tenants and the amount of rental income that tenants have paid. Since it is now a requirement that tenants report the amount of money that is paid for rent, landlords know that tax collection agencies now have the ability to confirm the amount of rental income that is received for rental properties. Moreover, the computer implemented method and system disclosed herein ensures that all tenants file a tax return. Since landlords are required to provide the tax identification numbers of all tenants, tenants are aware that tax collection agencies are aware of their rental status. When the tenants provide this information, other governmental agencies, for example, homeland security, police departments, etc., can use this information as an effective tool. The computer implemented method and system disclosed herein provides a cost effective way of confirming that landlords have reported all the rental income for a rental property. When a tenant files a return, the tenant will be required to provide the business tax identification number of the landlord and the amount of money that was paid to the landlord for a rental property. Since the landlord has to report the amount of rental income received from a tenant and the tenant has to report the amount of money paid to a landlord, the tax collection agencies will be able to check the accuracy of reporting.

Furthermore, the computer implemented method and system disclosed herein implements audit checks to ensure that the tenant's income correlates to the rental property. If the gross income for the household does not correlate to the rental income, the tax monitoring platform determines that all the tenants in the household may not have accurately reported all their income. Furthermore, the computer implemented method and system disclosed herein ensures that the census bureau accurately enumerates the number of people in a household. Based upon the information that was provided by the landlords, the correct number and the type of census forms can be provided to the households.

Furthermore, the computer implemented method and system disclosed herein ensures that every eligible person that is required to file a tax return is identified. When a prospective tenant applies for housing, the landlord must confirm that the tax identification number of each tenant is valid. Furthermore, the computer implemented method and system disclosed herein allows homeland security to identify illegal immigrants and individuals that have over stayed their visas. Since landlords must report the tax identification numbers of tenants, homeland security will have a more effective tool for tracking individuals. Furthermore, the computer implemented method and system disclosed herein ensures that general contractors accurately report the amount of money that is paid for services, for example, home renovations. With the computer implemented method and system disclosed herein, general contractors are required to provide landlords or homeowners with their business tax identification number and a customer number. The general contractor provides the business tax identification number and customer identification number to show the payment from the landlord on his/her tax return. When the landlord files his/her return, the business tax identification number and customer identification number are used to indicate a payment to a contractor. The tax collection agencies can correlate the information from the landlords and contractors to confirm that contractors are accurately reporting income and landlords are accurately reporting deductions.

The computer implemented method and system disclosed herein therefore provides tax collection agencies with a cost effective method to ensure that the taxable entities, for example, landlords, individual tax payers, small businesses, etc., comply with the tax laws. By requiring these taxable entities to provide additional information, the computer implemented method and system disclosed herein allows development of software applications for analyzing the data for detecting fraudulent tax returns.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 1 exemplarily illustrates a tax form generated by a tax monitoring platform for allowing a taxable entity to fill in tax information on a property.

FIG. 2 exemplarily illustrates a tax form generated by the tax monitoring platform for allowing a taxable entity to report tax information comprising a summary of payments made to an owner of a property by the taxable entity, in return for utilization of the property.

FIG. 3 exemplarily illustrates a tax form generated by the tax monitoring platform for allowing a taxable entity to record a summary of payments that the taxable entity made to a vendor for receiving services from the vendor.

FIG. 4 exemplarily illustrates a tax form generated by the tax monitoring platform for allowing a taxable entity to record a summary of payments received from customers in return for providing services to the customers.

FIGS. 9A-9E exemplarily illustrate an entity relationship diagram of a data model employed by a database management system of the tax monitoring platform for managing the tax information of taxable entities and enabling verification of tax liability and tax deductions reported by the taxable entities.

FIGS. 10A-10M exemplarily illustrate tables depicting the relationship between individual database entities of the data model employed by the database management system.

FIGS. 11A-11J exemplarily illustrate verification of tax liability and tax deductions reported on a taxable object by multiple taxable entities, using computer programs and tables implemented by the tax monitoring platform.

FIGS. 12A-12B exemplarily illustrate tax forms generated by the tax monitoring platform for a taxable entity utilizing a property for reporting the personal information of the taxable entity, information on taxable entities associated with the taxable entity, and the transaction details associated with the property.

DETAILED DESCRIPTION OF THE INVENTION

Figure 5:
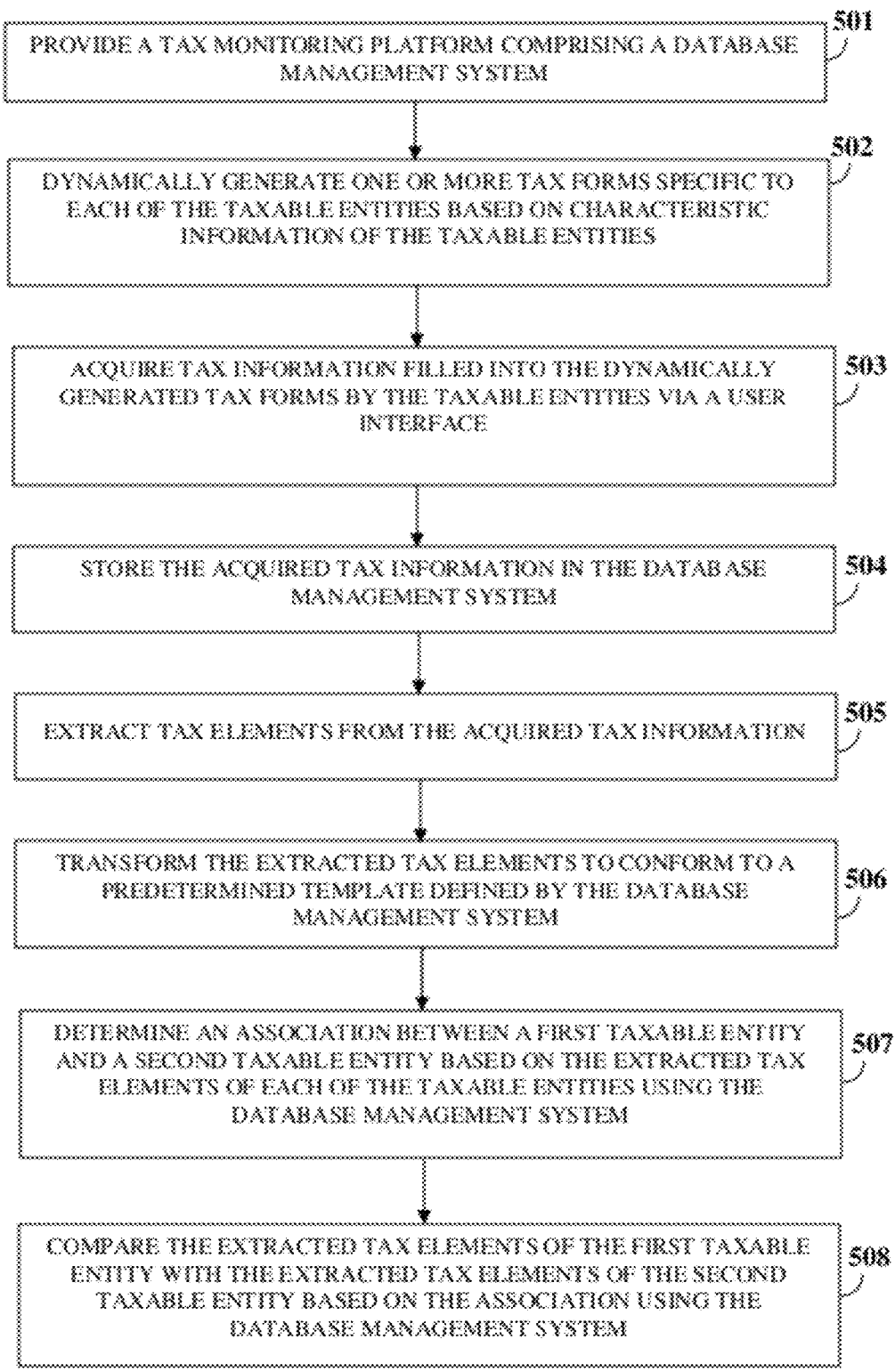
FIG. 5 illustrates a computer implemented method for verifying tax liability and tax deductions reported by taxable entities.

The computer implemented method disclosed herein accomplishes the following tasks: (1) Provides a method to reduce the ability of individual taxable entities, for example, tax payers to avoid filing tax returns; (2) Provides a method for a tax monitoring platform employed, for example, by tax collection agencies to identify taxable entities, for example, landlords that are underreporting rental income; (3) Provides a method for tax collection agencies to verify that some of the deductions are accurate; (4) Provides a method for tax collection agencies to verify that taxable entities, for example, businesses that provide services to homeowners and landlords accurately report revenues from homeowners and landlords; and (5) Provides a method for exchanging non-confidential information with other government agencies, for example, homeland security agencies, police departments of a state, etc. The computer implemented method and system disclosed herein allows tax collection agencies to use cost effective methods to identify taxable entities, for example, individuals and businesses that are not complying with tax laws.

As used herein, the term "taxable entity" refers to an individual or an organization that is liable to pay tax to the government of a country, for example, for income earned on a taxable object, transactions such as transfers and sales of taxable objects, etc. A taxable entity is, for example, an individual eligible to pay tax, a business organization, an owner of a taxable object, a user of a taxable object, etc. Also, as used herein, the term "taxable object" refers to a property, a commodity, a product, a service, an activity, etc., that is subjected to business transactions, generation of revenue or income or a tangible benefit to the taxable entities associated with the taxable object, and that is taxable by the government of a country.

To ensure that every potential tax payer files a tax return, tax collection agencies must be aware of everyone that is in the country legally and illegally. Since everyone requires some form of housing, the computer implemented method and system disclosed herein requires landlords to report all tenants who occupy their rental properties. Also, landlords and tenants are required to report everyone that is living in their households. By having landlords report the identities of tenants, tax collection agencies can confirm that the residents are filing tax returns. If an eligible tax filer knows that landlords and homeowners are required to report their presence, they are aware that it is more difficult to hide from tax collection agencies. If a landlord or a homeowner reports that a tenant exists and the tenant does not file a tax return, tax collection agencies will be aware that the tenant exists and has not filed a tax return. If an individual files a tax return and a landlord or a homeowner has not reported the individual as a tenant, the possibility exists that the landlord or the homeowner may be attempting to hide rental income. To ensure that landlords, tenants, and homeowners comply with the tax laws, stiff penalties and rewards could be used to ensure compliance.

The computer implemented method and system disclosed herein overcomes the problem that tax collection agencies face involving the underreporting of rental income from landlords and rental payments from close family members, as many landlords and homeowners who receive rental income from relatives and friends feel they do not have to report these payments as income.

In geographical locations where affordable housing is scarce, many landlords illegally subdivide single and multi-family houses into boarding houses. Even though a house is registered on a property tax roll as a single, two, or three family house, it does not actually mean that this is the actual number of apartments in that dwelling. It is well documented that unscrupulous landlords subdivide a dwelling into many apartments. Some landlords illegally create apartments in basements, attics, and garages. Since a landlord is required to provide a brief description of the property, the possibility exists that a landlord may try to hide the number of apartments or the number of tenants that may reside at the rental property. Based upon the information that is filed on a landlord's tax return, tax collection agencies cannot easily identify landlords who are receiving rental income from illegal apartments.

To ensure that rental income is reported accurately, the computer implemented method and system disclosed herein requires landlords to report the amount of rental income received from each tenant and requires each tenant to report rental payments rendered to a landlord. By requiring landlords to report rental income and tenants to report rental payments, tax collection agencies employing the tax monitoring platform disclosed herein can cross reference this information to ensure that landlords and homeowners are reporting all rental income. Since landlords and homeowners know that tenants will have to report all rental payments, they will be more likely to accurately report all their rental income. Not only are landlords and tenants required to report the rental payments, but, they must also report the amount of time that the apartment was leased.

Since the computer implemented method and system disclosed herein requires landlords and homeowners to report all the tenants at their rental properties, the tax monitoring platform of the computer implemented method and system disclosed herein generates a new tax form to report tenants that are residing in the apartments. When tenants move into an apartment, the landlord or homeowner must file a tax form that shows all the persons who reside at the apartment. On this new tax form, the landlord or homeowner must report, for example, the following information for each person: name, address, social security number, monthly rent, employer, start date of lease, and expected end date of the lease.

The existing tax form, for an individual, requires that the tax filer reports all the dependants. Since the possibility exists that a landlord may not be aware of everyone who is residing in a leased residence, for example, an apartment, the tax monitoring platform modifies the existing tax form to generate a new tax form that allows each tenant to list all the persons that reside at the leased residence. For each person listed in the tax form, the tax filer identifies the individuals who are dependants of the person, and the amount of money that each person contributes to the monthly rent. The sum of money reported by each tenant must be equal to the amount of money reported by the landlord.

Since enough information does not exist in the existing tax return forms used currently to determine which landlords are submitting fraudulent deductions, tax collection agencies need to hire more auditors to review tax returns from landlords. Under the existing taxation system, the landlord simply lists the amount of money that was paid for a service. The tax monitoring platform generates a tax form that requires landlords to associate a unique identifier to a tax deduction. The unique identifier is composed of a code to identify the vendor and a code to identify the vendor's customer. The code to identify the vendor is, for example, the vendor's tax identification number. The code to identify the customer is, for example, a code provided by the vendor to the customer. By requiring landlords to identify the vendor with the payment, tax collection agencies can use information from the vendor as a cross reference. For each tax deduction that a landlord is not verifiable in comparison with information from the vendor, the probability increases that the deduction may be fraudulent. Since vendors are required to report payments from landlords and homeowners, and landlords and homeowners are reporting payments to vendors such as contractors, tax collection agencies can confirm that landlords and vendors are accurately reporting deductions and revenue. Stiff penalties and rewards are implemented to prevent landlords and vendors from working together to maximize deductions for landlords and underreport revenue for the vendors.

To ensure that vendors are accurately reporting their revenues, the computer implemented method and system disclosed herein requires vendors to provide a detailed list of revenues generated from each customer. Since the vendor's customer, for example, a landlord, a homeowner, a business, etc., is required to file the amount of money paid to a vendor, and vendors are required to report revenues from each customer, the tax collection agencies employing the tax monitoring platform can generate reports to confirm that the proper deductions and revenues are more accurately reported. If the report indicates that the deduction or revenue does not match, the possibility exists that the claim by the landlord, that is, the customer, or the vendor is not accurate.

In an embodiment, since the computer implemented method and system disclosed herein requires landlords and residents to report all the persons in a household, a census bureau can use this information to increase the probability of enumerating the dwellings accurately. From the information that is provided by landlords and homeowners, a centralized database can be created to store a list of all the persons permitted residence in the country.

The following are examples of ways that the computer implemented method and system disclosed herein can be used to ensure individuals and businesses are in compliance with some of the tax laws.

Example A

John Smith is a landlord that owns a single family four bedroom house. To maximize profits, Mr. Smith has decided to illegally convert the single family house into a multi-family dwelling. The basement is converted into one apartment and the attic is converted into another apartment. Even though the house is on the property tax rolls as a single family house, Mr. Smith decides to disobey the zoning laws and not obtain the proper permits.

When Mr. Smith files tax returns for this rental property, Mr. Smith continues to declare that the house is a single family dwelling. Since Mr. Smith knows that it is highly unlikely that tax collection agencies ask tenants the amount of rent that is paid, Mr. Smith may not report the entire amount of rental income. On Mr. Smith's tax return, Mr. Smith has reported that the annual rental income for this property is $14,400. In this area, the tax collection agencies know that this is about how much the annual rental income is for a single family house. However, Mr. Smith collects $10,800 for the basement apartment from Adam Wright. For the apartment in the attic, Mr. Smith is collecting $12,000 from Robert Cox. For the rest of the house, Mr. Smith is collecting $14,400 from Scott Williams and Ann Jones.

The computer implemented method and system disclosed herein requires Mr. Smith to provide the name and social security information of each person on the lease and the total amount of money that each tenant or household unit is responsible for. To ensure the accuracy of the information provided by Mr. Smith, each tenant must provide the information to identify the landlord, for example, the address and the apartment number, and the total amount of money that was paid to the landlord. The amount of money that Mr. Smith reports for the rental unit must match the amount of money that all the tenants reported on their combined tax returns.

After speaking with Mr. Wright and Mr. Cox, Mr. Smith learns that they have no plans of filing tax returns because Mr. Wright is paid off the books and Mr. Cox is in the country illegally. Since Mr. Smith knows that they will not file the tax returns, Mr. Smith takes a chance and reports the rental income for the rental property as $14,400. Suppose that Mr. Cox has to file tax returns to apply for a mortgage. Mr. Cox needs to report how much money was paid for Mr. Cox's apartment in Mr. Cox's tax return. The computer implemented method and system disclosed herein generates a report stating that the amount of rental income reported by Mr. Cox's landlord, that is, Mr. Smith, is less than all the money paid to Mr. Smith. Since Mr. Smith was identified as underreporting the rental income, the tax return of Mr. Smith will be audited. By auditing Mr. Smith, a tax collection agency can investigate Mr. Smith for the current year and previous years. Since Mr. Smith did not list Mr. Cox as a tenant, the possibility exists that Mr. Smith has other tenants. If landlords know that tenants have to list them on their tax returns and tenants know that landlords have to identify all the tenants, landlords are less likely to take chances of underreporting rental income and tenants will have a much more difficult time of hiding from tax collection agencies.

Example B

Consider an example where Mr. John Smith owns a multi-family house that has three apartments. Mr. John Smith rents apartment A to the unmarried couple Scott Williams and Ann Jones for $1200 per month. Mr. John Smith rents apartment B to Adam Wright for $900 per month. Mr. John Smith rents apartment C to Robert Cox for $1000. When Mr. John Smith rents each apartment, Mr. John Smith files this information with the internal revenue service (IRS). On Mr. John Smith's tax return, he reports the annual rental income of $37,200. On Mr. Scott Williams' tax return, Mr. Scott Williams reports that he paid Mr. John Smith $450 per month. On Ms. Ann Jones' tax return, Ms. Ann Jones reported that she paid $450 per month to Mr. John Smith. On Mr. Adam Wright's tax return, Mr. Adam Wright reports that Mr. Adam Wright paid Mr. John Smith $900 per month.

Assume that Mr. Robert Cox fails to file a tax return. Since Mr. John Smith reported Mr. Robert Cox as a tenant for a specific time period and a tax return does not exist for Mr. Robert Cox for that time period, the computer implemented method and system disclosed herein determines the discrepancy, thereby making it difficult for tax evaders to hide from tax collection agencies. Suppose that Mr. Robert Cox is attempting to avoid paying child support. As Mr. Cox changes apartments, Mr. Cox's landlord will be required to file a tax form generated by the tax monitoring platform of the computer implemented method and system disclosed herein, stating that Mr. Robert Cox resides there. With this information, the appropriate authorities will have a much easier time to track Mr. Cox down. If individuals know that the appropriate authorities have the necessary information to track their movements, they will be more willing to comply with the laws.

Example C

John Smith owns a single family home that he plans to rent to tenants. John Smith hires a vendor, for example, AAA Contractors to renovate the kitchen for $30,000. As part of the deal, AAA Contractors tells Mr. John Smith that he can save some money by paying $20,000 by check and $10,000 in cash. The reason for accepting part of the payment in cash is for AAA Contractors to attempt to hide this revenue from tax collection agencies. Since Mr. Smith is having this work done, Mr. Smith decides to claim additional work was done in the bathroom for $15,000 by a fictitious company known as Bath Works. Mr. Smith generates phony receipts for Bath Works and Mr. Smith claims that he did not know that the company was not legitimate. When Mr. Smith, the landlord, files tax returns, Mr. Smith has to associate the total payments for AAA Contractors and Bath Works with the appropriate unique identification numbers. Also, AAA Contractors will indicate on their tax returns that AAA Contractors received a payment from John Smith.

On John Smith's tax return, John Smith declares $30,000 as the amount of money paid for work carried out by AAA Contractors and $15,000 as the amount of money paid for work carried out by Bath Works. AAA Contractors declares some or all of its customers and the amount of money that was received from the customers. Since Mr. John Smith paid $30,000 to renovate his kitchen and Mr. Smith wants the full deduction, Mr. Smith is more likely to report $30,000 for AAA Contractors rather than $20,000. John Smith forgets to report $20,000 and instead reports $30,000, while AAA Contractors report that Mr. John Smith paid only $20,000. When this happens, the computer implemented method and system disclosed herein identifies AAA Contractors as underreporting. Since Bath Works did not file a report that it received a payment of $15,000 for the bathroom from Mr. John Smith, the deduction for Bath Works is identified as a potential fraudulent deduction. If a large percentage of Mr. Smith's business expenses cannot be verified with what AAA Contractors has reported, there is a possibility that some of Mr. Smith's deductions are fraudulent. Also, if a large percentage of AAA Contractors' expenses cannot be verified by a customer, the possibility exists that AAA Contractors is underreporting revenues.

A vendor such as a contractor may have to contend with the fact that a customer may report the contractor for underreporting some of the contractor's revenues. By having customers such as landlords or homeowners reporting the amount of money paid to vendors such as contractors, and having the vendors reporting the amount of money received from customers, the computer implemented method and system disclosed herein allows tax collection agencies to identify potential fraudulent deductions and to discourage the underreporting of revenues by vendors.

Example D

To determine the houses that will be enumerated in a census, a census bureau depends upon information such as the property tax rolls to determine residences. From the property tax rolls, the dwellings are classified, for example, as a single family dwelling, a two family dwelling, and a hotel.

Victor Washington is a census enumerator who has to obtain a census form for a single family house. Even though the house is classified as a single family house, the dwelling is occupied by three families. Since Mr. Washington believes that this is a single family home, the probability is very high that Mr. Washington may not obtain census forms for the other families. Also, the possibility exists that the tenants do not want Mr. Washington to know that some of the apartments in the dwelling are illegal. By requiring the landlord or the homeowner to report the number of families in the dwelling, the census bureau will be able to obtain a more accurate account of the number of families in a dwelling.

FIG. 1 exemplarily illustrates a tax form generated by the tax monitoring platform for allowing a taxable entity to fill in tax information on a property. The taxable entity in this example is a landlord who leases apartments or residences on the property. The tax information to be filled in the generated tax form comprises, for example, the legal name of the landlord, business, or homeowner, unique identification information for identifying the landlord and the tenant such as the employer identification number, social security number, etc., the address of the owner of the property, the address of the property, the number of apartments leased out on the property, names of the tenants residing in the apartments, their addresses, monthly rent paid by the tenants, period of renting the apartments, that is, the start dates and end dates, etc.

FIG. 2 exemplarily illustrates a tax form generated by the tax monitoring platform for allowing a taxable entity to report tax information comprising a summary of payments made to an owner of a property by the taxable entity, in return for utilization of the property. The taxable entity in this example is a tenant residing in a leased residence on the property. The generated tax form is provided to each of the tenants residing in one or more leased residences on the property. The generated tax form comprises fields for recording a summary of payments, for example, the monthly and annual rental payments submitted by a tenant to the owner of the property, for example, a landlord. Further, the generated tax form provides fields for entering the name and residential address of each of the tenants.

FIG. 3 exemplarily illustrates a tax form generated by the tax monitoring platform for allowing a taxable entity to record a summary of payments that the taxable entity made to a vendor for receiving services from the vendor. The taxable entity in this example is a customer such as the landlord of a property. The vendor renders services, for example, housing repair, renovations, etc., to the landlord. The generated tax form provides fields for entering, for example, the name of the landlord, the address of the property for which the services were rendered, unique identification information to distinguish the individual vendors, for example, the employee identification numbers of the vendors, unique identification information of the customer such as the customer identification number, a description of the services rendered by the individual vendors to the customer, the payment made to the vendor by the customer for the services, etc.

FIG. 4 exemplarily illustrates a tax form generated by the tax monitoring platform for allowing a taxable entity to record a summary of payments received from customers in return for providing services to the customers. The taxable entity in this example is a vendor providing services to each of the customers such as landlords. The generated tax form provides fields for entering in details, for example, the name of the vendor, the address of the vendor, a summary of payments received by the vendor for providing services to the customers. The generated tax form further provides fields for entering, for example, unique identification information of the vendor such as the employee identification number of the vendor, unique identification information of each of the customers such as the customer identification numbers of the customers, a description of the services rendered by the vendor to each of the customers, and revenue or payments received from each of the customers for the services, etc.

FIG. 5 illustrates a computer implemented method for verifying tax liability and tax deductions reported by taxable entities. The computer implemented method disclosed herein provides 501 a tax monitoring platform comprising a database management system for storing, managing, and retrieving information on tax liability and tax deductions reported by the taxable entities. The database management system comprises, for example, a database of tax records of the taxable entities, modules of computer programs that create and control the management of the database, etc. The tax monitoring platform is accessible by the taxable entities over a network, via a user interface provided by the tax monitoring platform. The network is, for example, the internet, an intranet, a local area network, a wide area network, a communication network that implements Wi-Fi™ of the Wireless Ethernet Compatibility Alliance, Inc., a cellular network, a mobile communication network, etc.

The tax monitoring platform dynamically generates 502 one or more tax forms specific to each of the taxable entities based on characteristic information of the taxable entities retrieved, for example, from one or more of multiple third party databases via the network. As used herein, the term "characteristic information" refers to information that uniquely identifies or characterizes a taxable entity in a country, and that specifies demographics, for example, age, home ownership, employment status, income, etc., of the taxable entity. The characteristic information of a taxable entity such as an individual comprises, for example, a name and an address of the taxable entity, identification information such as the social security number (SS) of the taxable entity, an individual tax payer identification number (ITIN) of the taxable entity, an employer identification number (EIN) of the taxable entity, the residential status of the taxable entity such as whether the taxable entity is a tenant, a landlord, a homeowner, etc., the immigration status of the taxable entity such as whether the taxable entity is a citizen of the country, on a work permit, a student permit, a residency permit, etc. The third party databases are authorized external databases that store the characteristic information of the taxable entities. The third party databases are, for example, a property database, a tenancy database, a landlords' database, a registered identification number database, a state voter registration database, a driver's license registration database, a resident registration database, a tax assessment database associated with a census bureau, etc.

The tax monitoring platform enters into an agreement with the authorized third party databases that allow the tax monitoring platform to request for the characteristic information of the taxable entities from the third party databases. In an embodiment, the tax monitoring platform prompts a taxable entity via the user interface to provide unique identification information, for example, the social security number of the taxable entity. The tax monitoring platform initiates a search for the characteristic information of the taxable entities in the third party databases based on the unique identification information provided by the taxable entity. The tax monitoring platform utilizes tools and third party databases, for example, public databases for retrieving the characteristic information of the taxable entities that is used for generating the tax forms specific to the taxable entity. In an example, the tax monitoring platform performs a search for the address, property information, contact information such as phone numbers, business listings, etc., of the taxable entities at search engines such as a search engine provided by ZABASEARCH® of ZABA, Inc., Google Places® of Google, Inc., Google Maps of Google, Inc., etc. The taxable entities comprise individual taxpayers and businesses. Some of this characteristic information is obtained from databases of companies, for example, public records databases associated with Intelius® Inc. Some of the characteristic information is retrieved from public records, for example, public records databases managed by authorized tax assessors, voter registration databases, birth records databases, real estate appraisal record databases, business license databases, etc.

The tax monitoring platform performs a search in the database associated with the database management system of the tax monitoring platform to verify if a tax form was generated for a taxable entity during the previous tax year. The tax monitoring platform automatically imports the pertinent characteristic information of the taxable entities from the tax forms generated for the previous tax year to generate the tax forms for those taxable entities for the current tax year. Further, the tax monitoring platform performs a search in the third party databases to check for changes or updates in the characteristic information of the taxable entities, and determines if there is a need to generate a new tax form or alter the fields of an existing tax form based on the changes and the updates in the characteristic information. The tax monitoring platform searches the third party databases to correct any information that may be out of date.

In an example, when a taxable entity states that the taxable entity owns a property, the tax monitoring platform initiates a search at a search engine or accesses all the public databases that are associated with that property information. The tax monitoring platform retrieves details on the property information associated with the taxable entity. Further, when the ownership of the property is changed, for example, in the event of a death, transfer of ownership rights by a taxable entity, etc., the tax monitoring platform contacts an authorized tax assessor for retrieving information on the owners of the property, the renewed tax assessment, etc., from a public database. Further, when a taxable entity announces a change of address, the change of address is updated in public records. The tax monitoring platform contacts public records databases via the network to retrieve information on the changed address. When an individual changes his/her address, the event is recorded in the public records databases and is therefore in the public domain.

Consider another example where the tax monitoring platform needs to generate a tax form for individual taxable entities, for example, individual taxpayers who provide information about the individuals living in a leased residence on a property. The tax monitoring platform retrieves the information, for example, a social security number, a telephone number, etc., of each of the residents from a credit reporting agency or a credit bureau that stores information on all individuals who are known to live at the specified address associated with the leased residence.

When a business is registered with the state or federal government, the business information is available in public databases associated with the state or federal government or with a third party vendor such as the D&B professional contacts database, Dun's market identifiers$^{SM}$ database, Dun's electronic business directory, etc., associated with the Dun & Bradstreet® Corporation. The databases, for example, store information on the owners of the business, the mailing address of the business, the location of the business, contact names, employee size, organization status, corporate linkages, etc.

The tax monitoring platform collates the characteristic information of each taxable entity, creates a record for the taxable entity, and generates one or more tax forms based on the characteristic information of the taxable entity. In an embodiment, the tax monitoring platform selects a specific tax form from a predetermined list of tax forms that matches the characteristic information of the taxable entity. The tax monitoring platform generates separate tax forms for a taxable entity, for example, based on the residential status of the taxable entity. In an example, the tax monitoring platform generates separate tax forms with different fields for a tenant and different fields for a landlord utilizing a property. If the tax monitoring platform determines that a taxable entity is a landlord from the characteristic information, the tax monitoring platform dynamically generates a tax form specific to the landlord as exemplarily illustrated in FIG. 1. If the tax monitoring platform determines that a taxable entity is a tenant from the characteristic information, the tax monitoring platform dynamically generates a tax form specific to the tenant as exemplarily illustrated in FIG. 2.

The tax form for a tenant comprises fields for entering, for example, a rental payment that the tenant renders to the landlord for using a leased residence on the property, the deductions claimed on the rental payment, number of other tenants on the property, relationship of the other tenants on the property, etc. The tax monitoring platform specifies additional fields in the tax forms for acquiring information on the number of individual residents who share the leased residence with the tenant, the relationship between the tenant and the residents, the relationship between the landlord and the tenants, the number and unique identification information of the residents who contribute to the total rental payment for the leased residence, the individual rental payments rendered by the residents contributing to the total rental payment for the leased residence, etc. The tax monitoring platform may also specify additional fields in the tax forms for reporting the relationship between each of the tenants and the landlord. The tax monitoring platform uses the information to determine the validity of the deductions claimed on the rental income. The tax monitoring platform generates a tax form, for example, "Form 7777" specific to the tenant as disclosed in the detailed description of FIGS. 12A-12B.

In an embodiment, the tax monitoring platform generates and attaches the tax forms to an electronic mail (email) that the tax monitoring platform dispatches to the taxable entities. In an embodiment, the tax monitoring platform allows the taxable entities to download the tax forms on computing devices, fill in the tax forms offline, and submit the completed tax forms over the network, via the user interface. In another embodiment, the tax monitoring platform allows the taxable entity to complete the tax form online on the user interface.

The tax monitoring platform acquires 503 tax information filled into the dynamically generated tax forms by the taxable entities, via the user interface. As used herein, the term "tax information" refers to information comprising, for example, the gross income earned by a taxable entity, tax liabilities, tax deductions for which the taxable entity is eligible, etc., that needs to be submitted by the taxable entities to a government of a country. The tax information comprises, for example, property tax information, income tax information, license tax information, etc. The tax monitoring platform acquires tax information comprising, for example, one or more of the number of taxable entities associated with a taxable object, the identification of each taxable entity that contributes to the income earned by another taxable entity from the taxable object, relationship between the taxable entities, dependency status of each of the taxable entities, and payment rendered by each of the taxable entities that contributes to the income earned by other taxable entities, for utilization of the taxable object. The taxable object is, for example, a property, a good, a service, etc., owned by a landlord or rendered by a vendor or a business organization, etc. The term "property" refers, for example, to real property or immovable property such as land or human made structures on land that can be sold, consumed, rented, mortgaged, occupied, etc.

The tax monitoring platform may also acquire the tax information through standard tax forms, for example, Form 1040, that is, the United States (US) individual tax return form for filing individual federal tax returns, Form W-2, that is, the wage and tax statement form that is used to report wages paid to employees of a business organization and the taxes withheld from them, etc. The tax monitoring platform stores 504 the acquired tax information in the database management system.

In an example where the taxable object is a property, one of the taxable entities herein referred to as a "first taxable entity" is an owner of the property, while another one or more of the taxable entities herein referred to as "second taxable entities" are the tenants residing in a leased residence, for example, an apartment, on the property. A second taxable entity, that is, a tenant residing in the apartment and who is eligible to pay tax, provides tax information by reporting each of the residents residing in the apartment, the relationship between the tenant and each of the residents, for example, the spouse, a child, a co-resident, a friend, etc., and the residents who are dependants of the tenant, for example, the tenant's children. The tenant provides the identification information of the individual residents who contribute to the total rental payment for the leased residence, and the individual payments contributed by the residents to the total rendered payment. The first taxable entity, that is, the owner of the property provides tax information by reporting information on the property, for example, identification information to uniquely identify the property, unique identification information of each of the tenants residing on the property, the total rental income from the property, etc. The first taxable entity and the second taxable entity provide the tax information by filling in specific tax forms dynamically generated by the tax monitoring platform for the first taxable entity and the second taxable entity respectively.

In another example, the taxable object is a service rendered by a first taxable entity, for example, a vendor of a service, to a second taxable entity, for example, a customer such as a landlord. The tax information provided by the vendor in a specific tax form dynamically generated by the tax monitoring platform for the vendor comprises the unique identification information of the vendor, for example, the employer identification number of the vendor, the type of service, the transaction amount, the deductions and tax credits claimed on the service, etc. The tax information provided by the customer in a specific tax form dynamically generated by the tax monitoring platform for the customer comprises the unique identification information of the customer, for example, the customer identifier, the type of service received from the vendor, the transaction amount, etc.

In an embodiment, the tax monitoring platform identifies errors in the acquired tax information and notifies the taxable entities to correct the errors via the user interface. For example, the tax monitoring platform may determine that the tax information is incomplete, that the taxable entity has not provided a signature or has provided a signature in the wrong field in the tax form, that the taxable entity has provided an invalid date or year of filing, that the taxable entity has claimed deductions on a non-deductible taxable object, etc. The tax monitoring platform notifies the errors to the taxable entities, for example, via an electronic mail (email) message, a short message service (SMS) message, etc. The tax monitoring platform allows the taxable entities to correct the errors in the reported tax information via the user interface.

In an embodiment, the tax monitoring platform updates the acquired tax information in the database management system on receipt of inputs from the taxable entities via the user interface, about change in the characteristic information of the taxable entities. The change of characteristic information comprises, for example, change in the residential status of the taxable entity, a change in the immigration status of the taxable entity, a change in the marital status of the taxable entity, a change in the employment status of the taxable entity, a change in the address of the taxable entity, etc. In an example, when a residential status of a taxable entity changes, for example, when an individual applies for a leased residence or when a taxable entity such as a tenant moves out of the leased residence, an associated taxable entity, for example, a landlord can report the residential status information for updation to the tax monitoring platform via the user interface. The tax monitoring platform updates the tax information in the database management system since a change in the characteristic information determines a change in the tax liability and allowed tax deductions for the taxable entity.

The tax monitoring platform extracts 505 tax elements from the acquired tax information and transforms 506 the extracted tax elements to conform to a predetermined template defined by the database management system. As used herein, the term "tax elements" refers to specific tax details in the tax information that are required for determining the tax liability of the taxable entity. The tax elements comprise, for example, one or more of a tax year, unique identification information of the taxable entities, name of each of the taxable entities, address of each of the taxable entities, income associated with each of the taxable entities, number of second taxable entities associated with the first taxable entity, transaction information associated with the taxable object utilized by each of the taxable entities, employer information, etc. The transaction information comprises, for example, identification information for identifying the taxable object, a start date of utilization of the taxable object, an expected end date of utilization of the taxable object, income earned from the taxable object, payments rendered for utilization of the taxable object, etc. The tax monitoring platform utilizes, for example, structured query language (SQL) queries to extract the tax elements from the tax information stored in the database of the database management system.

In an example, one of the tax elements extracted from the tax information acquired from a first taxable entity is income earned by the first taxable entity on a taxable object owned by the first taxable entity, and one of the tax elements extracted from the tax information acquired from a second taxable entity is a payment rendered by the second taxable entity for utilization of the taxable object. As used herein, the term "first taxable entity" refers to an owner of a taxable object, and the "second taxable entity" refers to an individual or an organization that utilizes or pays for the taxable object owned by the first taxable entity. Also, as used herein, the term "unique identification information" refers to information that uniquely distinguishes an individual or an organization and enables legal tracking of the individual or organization for taxation. The unique identification information is determined by a government organization and issued to the individual or organization. The unique identification information comprises for example, a social security number of the taxable entity, a business tax identification number of the taxable entity, a national identification number such as an insurance card number, an individual tax payer identification number, an employer identification number, etc.

The transaction information comprises information on the conditions for a contract between associated taxable entities to allow utilization of the taxable object in return for payment. In an example where the taxable object is a property, the first taxable entity is an owner of the property, and the second taxable entity is a tenant residing in a leased residence on the property, the transaction information comprises identification information to identify the property and a specific leased residence on the property, a start date of lease for the leased residence, an expected end date of the lease for the leased residence, the rental income earned from the tenant for the duration of the lease, the monthly and annual payments rendered by the tenant for the duration of the lease, etc. In another example where there may be multiple owners of the property, the transaction information comprises a percentage share of ownership of the property, the individual rental income earned by each owner from the property, etc.

In another example where the taxable object is a service, the first taxable entity is a vendor who renders the service, and the second taxable entity is a customer who receives the service, the transaction information comprises, for example, a transaction amount exchanged between the vendor and the customer, the type of business such as a charity organization, the type of business transaction, the business identification information comprising, for example, the registered identification number that identifies the business, the employer identification number (EIN) that uniquely identifies the owner of the business, etc. The EIN information, business type, etc., enables the tax monitoring platform to contact a third party database, for example, a Form 990 database associated with the internal revenue service (IRS) for determining whether a business organization is, for example, a charity organization, and whether the payments made by the taxable entities are eligible for tax exemptions or tax deductions. In an example, the vendor provides a customer identification number to the customer. The vendor and the customer both report the customer identification number during submission of their tax information. The tax monitoring platform utilizes the customer identification number to establish an association between the vendor and the customer and compare the business transaction information of the customer and the vendor.

In another example where the taxable object is a service such as a house repair service, the first taxable entity is an owner of the service such as a house repair contractor, and the second taxable entity is a customer such as a landlord who has employed the services of the house repair contractor, the transaction information comprises, for example, the income earned by the house repair contractor for services rendered for a specified duration to the landlord, the payments rendered by the landlord for the services, etc.

In an embodiment, the database management system of the tax monitoring platform configures the predetermined template for organizing the tax elements extracted from the acquired tax information of the taxable entities in the database management system. Further, the database management system configures the predetermined template for enabling determination of the association between the first taxable entity and the second taxable entity, and for performing automated retrieval of the tax elements from the database management system. As used herein, the predetermined template is a logical data format created in accordance with a data model employed by the database management system for managing the tax information of the taxable entities and enabling verification of tax liability and tax deductions reported by the taxable entities. The data model is, for example, a relational database model. The database management system comprises, for example, a collection of structured tables that are associated with the taxable entities and that store the tax elements extracted from the tax information reported by the taxable entities. The database management system relates the structured tables according to the association between the taxable entities.

For transforming the extracted tax elements to conform to the predetermined template defined by the database management system, the database management system divides the extracted tax elements into separate groups that allow arrangement of the tax elements into fields of the predetermined template. Further, the database management system converts the data format of the tax elements to the requisite data format defined by the predetermined template. For example, a date and month corresponding to a tax element such as a lease date acquired from a taxable entity may be represented partly in words. The database management system converts the date and the month to the data format, for example, a numerical format, defined by the predetermined template to enable conformance of the extracted tax elements to the predetermined template. The database management system populates the fields of the predetermined template with the transformed tax elements.

In an embodiment, the tax monitoring platform utilizes a structured query language (SQL) model and populates the tax elements in preconfigured SQL tables in the database management system. Further, the tax monitoring platform links the SQL tables to establish an association between the taxable entities, the taxable objects, and the tax information.

In an embodiment, the tax monitoring platform receives requests for one or more tax elements extracted from the acquired tax information, from one or more governing authorities via the network. The governing authorities are, for example, a federal investigation agency, a social security agency, a social insurance agency, a revenue agency, etc. The governing authorities may request specific tax elements, for example, the social security number of a taxable entity, the gross income reported by the taxable entity, etc., for example, to meet operational requirements, to cross-verify the information collected by the governing authorities, and to identify inconsistencies in the databases associated with the governing authorities. In an embodiment, the tax monitoring platform determines the information that needs to be replicated to the external databases based on a predetermined list of tax elements that match the information needed by the external databases. The tax monitoring platform retrieves the requested tax elements from the database of the database management system. The tax monitoring platform replicates the retrieved tax elements to one or more external databases associated with the governing authorities via the network.

In an embodiment, the tax monitoring platform encrypts the tax elements extracted from the acquired tax information and transmits the encrypted tax elements to the governing authorities via the network. The tax monitoring platform employs, for example, public key cryptography and exchanges a public key with the governing authority. The private key is already known to the governing authority and is used to decrypt the tax elements provided by the tax monitoring platform. In an embodiment, the tax monitoring platform transmits unique identification information, for example, the social security numbers of the taxable entities, extracted from the acquired tax information to a census authority, via the network for enabling the census authority to perform a population count operation. For example, the tax monitoring platform transmits the unique identification information, for example, social security numbers of the taxable entity to a governing authority such as a homeland security department to enable the homeland security department to identify illegal immigrants and individuals who have over stayed their visas.

The tax monitoring platform determines 507 an association between a first taxable entity and one or more second taxable entities based on the extracted tax elements of each of the taxable entities using the database management system. The tax monitoring platform utilizes, for example, the unique identification information of each of the taxable entities and the taxable object to determine the association. The database management system enables determination of association between the first taxable entity and the second taxable entity by organizing the tax elements of each of the taxable entities in structured tables, and creating indices to link the associated taxable entities, the taxable objects, and the tax information of the taxable entities. The index refers, for example, to a tuple comprising the unique identification information of the first taxable entity, the unique identification information of the associated second taxable entity, and the identification information of the taxable object. The tax monitoring platform can select the appropriate index to extract taxable elements on the associated taxable entities and the taxable object.

In an example where the taxable object is a property, the first taxable entity is an owner of the property, and the second taxable entity is a tenant residing in a leased residence on the property, the tax monitoring platform establishes an association between the owner and the tenant associated with the property, by comparing the property identification information that is unique to the property and that reported by each of the owner and the tenant. The tax monitoring platform establishes an association between the owner and the tenant, for example, by determining the tax year reported by the owner and the tenant, and comparing the unique identification information of the tenant as reported by the owner in the owner's tax information, and the unique identification information of the owner as reported by the tenant in the tenant's tax information.

The tax monitoring platform compares 508 the extracted tax elements of the first taxable entity with the extracted tax elements of the second taxable entity based on the association using the database management system, for determining the accuracy of reporting of the tax information by the taxable entities. The determination of the accuracy of reporting of the tax information by the taxable entities verifies the tax liability and the tax deductions reported by the taxable entities.

In an example, the tax monitoring platform compares the income earned by the first taxable entity on the taxable object owned by the first taxable entity with the payment rendered by the second taxable entity for utilization of the taxable object using the database management system. The tax monitoring platform verifies the rendered payment reported by each second taxable entity with the income reported by the first taxable entity for each second taxable entity. The tax monitoring platform verifies an equivalence of sum of the rendered payment reported by each second taxable entity with a sum of the income reported by the first taxable entity for each second taxable entity.

In an example where the taxable object is a property, the first taxable entity is an owner of the property, and the second taxable entities are tenants or residents residing in a leased residence on the property, the tax monitoring platform compares the total rental income reported on the leased residence by the owner with the total rental payment rendered by the tenants for the leased residence. The total rental payment comprises the sum of the individual rental payments contributed by each of the tenants in the leased residence. The tax monitoring platform compares the individual rental payments rendered by each tenant in the leased residence with the individual rental incomes generated from each of the tenants and reported by the owner of the property, to enable scrutiny of individual transactions between the owner of the property and each of the tenants. The listing of the individual tenants, and the rental payments rendered by each of the tenants increases the number of levels of verification and therefore, improves the probability of detection of discrepancies by the tax monitoring platform. For example, the tax monitoring platform checks the individual rental payments rendered by each of the tenants with the individual rental incomes reported by the owner of the property. Further, the tax monitoring platform computes the sum of the rental payments and compares the total rental payment with the total rental income reported by the owner of the property.

Consider an example where the total rental income matches the total rental payment reported by the tenants, however, the sum of the individual rental payments is not equal to the total rental payment. This may be due to over reporting of rental payments by a tenant. Since the tax monitoring platform acquires the tax information from each of the tenants separately, the tax monitoring platform improves the probability of detecting discrepancies in reporting of tax information. The tax monitoring platform also checks the relationship between the tenants and the landlord, for example, to verify the validity of the deductions claimed on the rental property. Consider an example where a landlord rents a property to relatives at a lower price than the fair rental price for the property and claims complete deductions for the property at the fair rental price. The tax monitoring platform determines the fair rental price for the property, and checks whether the rental income received from the tenants by the landlord is lower than the fair rental price. If the rental income reported by the owner is lower than the fair rental price, the property is considered as a personal utilization and therefore the landlord may not be eligible for all the deductions claimed.

In another example, the tax monitoring platform verifies the tax liability and deductions claimed on services rendered by a first taxable entity, for example, a vendor of information technology (IT) services to a second taxable entity, for example, a customer using the IT services. The tax monitoring platform performs verification by comparing the income reported from the rendering of the IT services by the vendor, with payment for the services as reported by the customer. The tax monitoring platform compares the tax information of the vendor and the customer, based on the association determined from the unique identification information of the owner of the business, the unique identification information of the customer, and a business transaction identifier. Further, the tax monitoring platform compares the total income reported from the business by the vendor with the sum of the individual payments rendered by each of the customers to verify the tax liability and deductions of the vendor and the customers. In another example, a first taxable entity, for example, an owner of a business may rent out a property associated with the business premises to a second taxable entity, for example, a customer. The taxable objects in this example are the property associated with the business and the services provided by the vendor.

The tax monitoring platform generates a report based on the comparison that determines the accuracy of reporting of the tax information and transmits the generated report, for example, to one or more of an authorized tax entity, governing authorities, etc. As used herein, the term "authorized tax entity" refers to a government organization or an intermediary organization associated with a government organization that collects tax forms from the taxable entities and processes the collected tax forms. The authorized tax entity is, for example, an auditor supervising tax return forms, a government revenue agency, etc. In an embodiment, the tax monitoring platform transmits the generated report to the first taxable entity and the second taxable entity.

The tax monitoring platform identifies discrepancies in the acquired tax information during the comparison of the extracted tax elements of the first taxable entity with the extracted tax elements of the second taxable entity based on the association. The tax monitoring platform records the discrepancies in the generated report to notify the authorized tax entity, governing authorities, etc. In an embodiment, the tax monitoring platform updates the generated report based on discrepancy information acquired externally from one or more of an authorized tax entity, governing authorities, etc., via the network. For example, the tax monitoring platform may be notified of discrepancies from a governing authority such as a census bureau, if the census bureau detects inconsistencies or discrepancies in the tax elements received from the tax monitoring platform. The tax monitoring platform receives notifications from the authorized tax entities, for example, via email, a short message service (SMS) message, etc. In an embodiment, the tax monitoring platform notifies the taxable entities that discrepancies were determined in the tax information acquired from the taxable entities and requests the taxable entities to provide a confirmation that the tax information initially reported by the taxable entities is correct. The taxable entities can update the tax information via the user interface provided by the tax monitoring platform, dispatch an electronic mail responding to the notification, etc. The tax monitoring platform may also notify the taxable entities that an authorized tax entity has been informed of the discrepancies.

Furthermore, the tax monitoring platform determines discrepancies or a likelihood of discrepancies, for example, identifying property owners whose reported rental income does not match the rental payments that were paid by all the tenants in the household, identifying all properties where rental payments were reported without any rental income reported by landlords for those properties, identifying a property whose rental payments have been reported by the second taxable entity such as a tenant, but is not complemented by a matching rental income reported by the first taxable entity such an owner of the property, identifying a second taxable entity whose rental payments are not consistent with the gross income of the first taxable entity, identifying all property owners whose reported rental income from a rental property is drastically different from the rental income reported by other property owners on properties with similar characteristics in a geographical area, identifying a property on which a rental income was reported in previous years but for which no rental income was reported for the current year, identifying properties that may have been rental properties but there was no reporting of rental income, etc. The tax monitoring platform, for example, compares the tax information acquired from the taxable entity with the tax information retrieved from an external database associated with a tax collection agency, for determining that a rental income was not reported by the taxable entity for the current year. The tax monitoring platform also performs a search for all properties with the same state, city, and area as the property reported by the taxable entity. Further, the tax monitoring platform compares the characteristic information of the properties, for example, the dimensions of the property, the total number of tenants occupying the property, and the total rental income collected by property owners in a geographical area with the tax information reported by the taxable entity to determine whether a difference between the total income reported by the taxable entity and other property owners exceeds a predetermined value.

Figure 6:
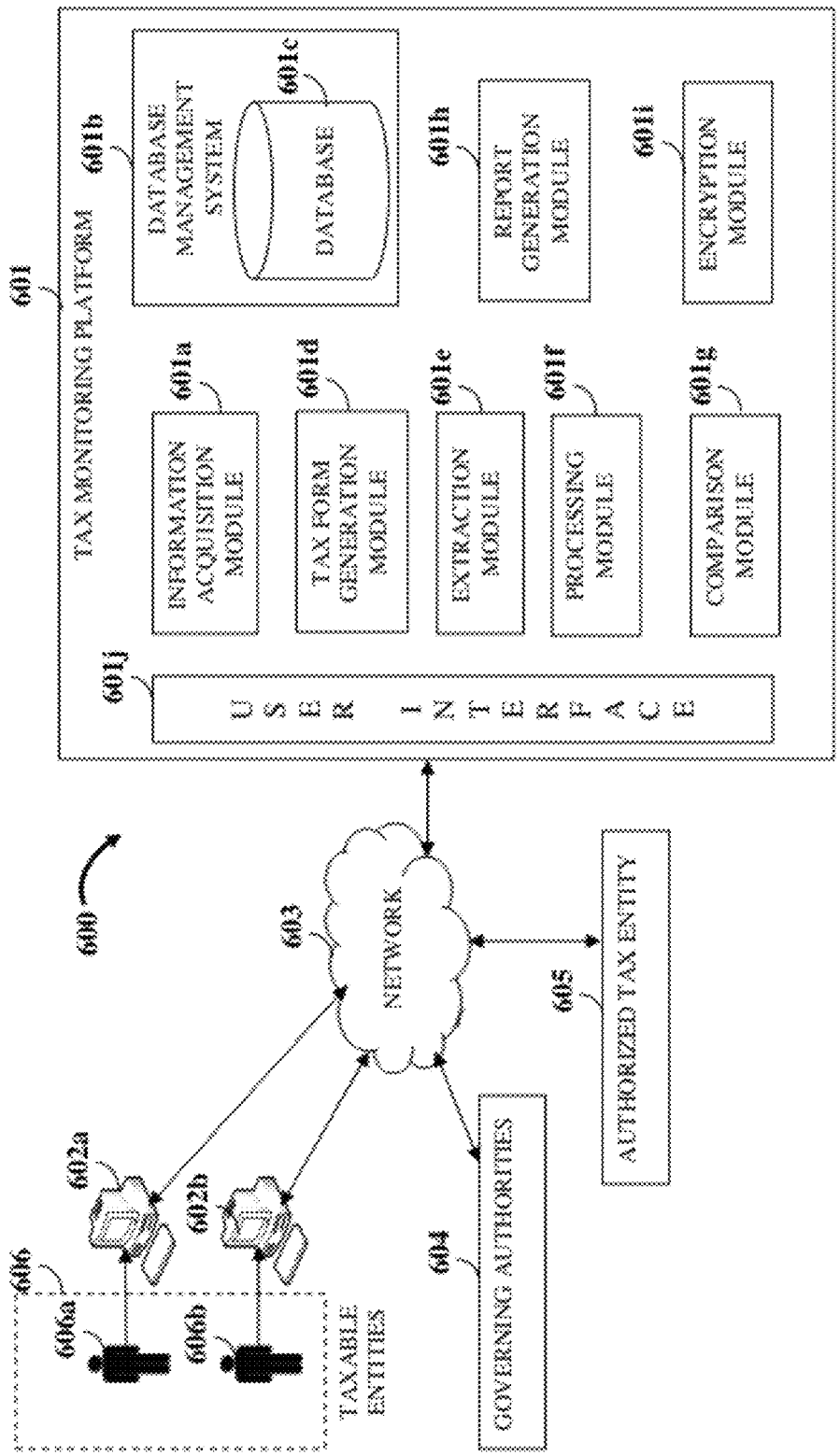
FIG. 6 illustrates a computer implemented system for verifying tax liability and tax deductions reported by taxable entities.

FIG. 6 illustrates a computer implemented system 600 for verifying tax liability and tax deductions reported by taxable entities 606. The computer implemented system 600 disclosed herein comprises a tax monitoring platform 601 that is accessible by multiple taxable entities 606 over a network 603, via a user interface 601*j* provided by the tax monitoring platform 601. In an embodiment, the tax monitoring platform 601 is hosted on a server. The user interface 601*j* is, for example, a graphical user interface. The tax monitoring platform 601 communicates with computing devices 602*a* and 602*b* of the taxable entities 606 via the network 603. The network 603 is, for example, the internet, an intranet, a local area network, a wide area network, a communication network that implements Wi-Fi™ of the Wireless Ethernet Compatibility Alliance, Inc., a cellular network, a mobile communication network, etc. The tax monitoring platform 601 communicates, for example, with an authorized tax entity 605, one or more governing authorities 604, etc., via the network 603. The tax monitoring platform 601 comprises a database management system 601*b*, a tax form generation module 601*d*, an information acquisition module 601*a*, an extraction module 601*e*, a processing module 601*f*, and a comparison module 601*g*. In an embodiment, the tax monitoring platform 601 further comprises a report generation module 601*h* and an encryption module 601*i*.

The database management system 601*b* stores, manages, and retrieves information on the tax liability and the tax deductions reported by the taxable entities 606. The database management system 601*b* comprises modules of computer programs that manage the creation, maintenance, and utilization of one or more databases 601*c* that store the tax information of the taxable entities 606. In an embodiment, the database 601*c* stores the tax information in a collection of tables, data records, structured files, etc. The database 601*c* is a centralized database that is a part of the tax monitoring platform 601. In an embodiment, the database 601*c* is a distributed database residing on multiple servers that is accessed by the database management system 601*b* of the tax monitoring platform 601 via the network 603. The database management system 601*b* configures a predetermined template for organizing tax elements extracted from the acquired tax information of the taxable entities 606 in the database management system 601*b*. Further, the database management system 601*b* configures the predetermined template for enabling the comparison module 601*g* to determine the association between the first taxable entity 606*a* and the second taxable entities 606*b*, and for performing an automated retrieval of the tax elements from the database management system 601*b*.

The tax form generation module 601*d* dynamically generates one or more tax forms specific to each of the taxable entities 606, based on characteristic information of the taxable entities 606 retrieved from multiple third party databases via the network 603. The information acquisition module 601*a* collects unique identification information of the taxable entities 606, for example, a social security number, from the taxable entities 606 and transfers the collected unique identification information to the tax form generation module 601*d*. The tax form generation module 601*d* inputs the unique identification information acquired from the taxable entities 606 at an interface of authorized entities hosting third party databases to obtain the characteristic information of the taxable entities 606 from the third party databases, analyzes the characteristic information, and dynamically generates one or more tax forms based on the characteristic information of the taxable entities 606. In an embodiment, the tax form generation module 601*d* automatically updates the tax forms based on updated tax information or characteristic information.

The information acquisition module 601*a* acquires tax information filled into the dynamically generated tax forms by the taxable entities 606 via the user interface 601*j* and stores the acquired tax information in the database 601*c* of the database management system 601*b*. The information acquisition module 601*a* acquires, for example, one or more of a number of second taxable entities 606*b* associated with a taxable object, identification information of each of the second taxable entities 606*b* that contributes to income earned by the first taxable entity 606*a* from the taxable object, a relationship between the second taxable entities 606*b*, relationship between the first taxable entity 606*a* and the second taxable entities 606*b*, dependency status of each of the second taxable entities 606*b*, and payment rendered by each of the second taxable entities 606*b* that contributes to the income earned by the first taxable entity 606*a*, for utilization of the taxable object. In an example, the information acquisition module 601*a* acquires tax information on a taxable object, for example, a property, from the taxable entities 606, for example, the owner of the property and the tenants residing in a leased residence on the property. The information acquisition module 601*a* acquires the tax information from the dynamically generated tax forms. The information acquisition module 601*a* distinguishes the type of tax forms, for example, a tax form for tenants, a tax form for landlords, etc., and stores the tax information from the tax forms in specified tables or records of the database 601*c* of the database management system 601*b*.

In an embodiment, the information acquisition module 601*a* updates the tax information in the database management system 601*b* on receipt of inputs from the taxable entities 606 about change of the characteristic information of the taxable entities 606 via the user interface 601j. For example, the information acquisition module 601a may receive a change in the characteristic information of the taxable entities 606 such as a change in the residential status of a tenant and updates the tax information in the database management system 601b. In an embodiment, the information acquisition module 601a executes a script that automatically changes the values of specified fields of the tables in the database 601c. The extraction module 601e extracts the tax elements from the acquired tax information.

The processing module 601f transforms the extracted tax elements to conform to the predetermined template defined by the database management system 601b. In an embodiment, the processing module 601f, in communication with the database management system 601b, identifies errors in the acquired tax information and notifies the taxable entities 606 to correct the errors via the user interface 601j. For example, the processing module 601f may automatically generate an electronic mail that details the errors identified in the acquired tax information and transmit the electronic mail to the taxable entities 606 for correction. In another example, the processing module 601f may prompt the taxable entities 606 to correct the errors on the user interface 601j.

In an embodiment, the database management system 601b replicates one or more tax elements extracted from the acquired tax information to one or more external databases associated with one or more governing authorities 604 via the network 603. The information acquisition module 601a receives requests for the tax elements from one or more governing authorities 604 via the network 603. The database management system 601b, in communication with the information acquisition module 601a, retrieves the tax elements, based on the requests for the tax elements received from one or more governing authorities 604, and automatically replicates the retrieved tax elements to the external databases via the network 603. The extraction module 601e extracts the tax elements requested by one or more external databases from the database management system 601b and transmits the extracted tax elements to the external databases over the network 603. In an embodiment, the encryption module 601i encrypts the extracted tax elements prior to transmitting the tax elements to one or more governing authorities 604 via the network 603.

The comparison module 601g determines an association between a first taxable entity 606a and a second taxable entity 606b based on the extracted tax elements of each of the taxable entities 606, and compares the extracted tax elements of the first taxable entity 606a with the extracted tax elements of the second taxable entity 606b based on the association using the database management system 601b, for determining accuracy of reporting of the tax information by the taxable entities 606 to verify the tax liability and the tax deductions reported by the taxable entities 606. For example, the comparison module 601g compares an income earned by the first taxable entity 606a on a taxable object owned by the first taxable entity 606a with a payment rendered by the second taxable entity 606b for utilization of the taxable object using the database management system 601b. The comparison module 601g verifies the rendered payment reported by each second taxable entity 606b with the income reported by the first taxable entity 606a for each second taxable entity 606b. The comparison module 601g verifies an equivalence of sum of the rendered payment reported by each second taxable entity 606b with a sum of the income reported by the first taxable entity 606a for each second taxable entity 606b.

In an embodiment, the comparison module 601g identifies discrepancies in the acquired tax information while performing the comparison of the extracted tax elements of the first taxable entity 606a with the extracted tax elements of the second taxable entities 606b based on the association, using the database management system 601b. The report generation module 601h generates a report based on the comparison that determines the accuracy of reporting of the tax information. The report generation module 601h transmits the generated report, for example, to one or more of an authorized tax entity 605, governing authorities 604, etc., via the network 603. The report generation module 601h, in communication with the information acquisition module 601a, updates the generated report based on discrepancy information acquired externally, for example, from one or more of an authorized tax entity 605, governing authorities 604, etc., by the information acquisition module 601a via the network 603. The report generation module 601h transmits the updated report to one or more of an authorized tax entity 605, governing authorities 604, etc., via the network 603.

In an embodiment, the extraction module 601e extracts unique identification information of the taxable entities 606 from the acquired tax information stored in the database management system 601b and transmits the extracted unique identification information to a census authority via the network 603 for enabling the census authority to perform a population count operation.

Figure 7:
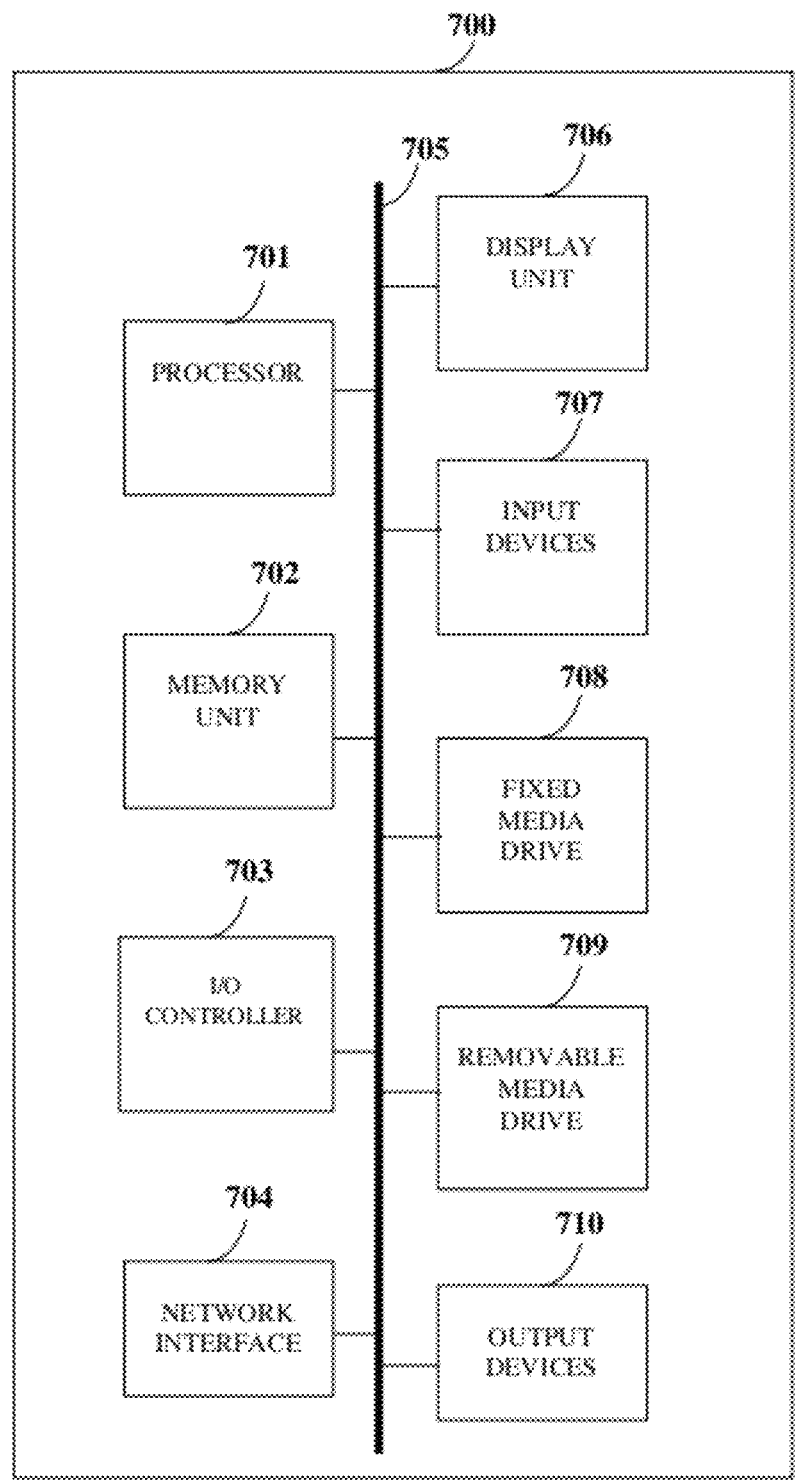
FIG. 7 exemplarily illustrates the architecture of a computer system employed by the tax monitoring platform for verifying tax liability and tax deductions reported by taxable entities.

FIG. 7 exemplarily illustrates the architecture of a computer system 700 employed by the tax monitoring platform 601 for verifying tax liability and tax deductions reported by taxable entities 606. The tax monitoring platform 601 of the computer implemented system 600 exemplarily illustrated in FIG. 6 employs the architecture of the computer system 700 exemplarily illustrated in FIG. 7.

The tax monitoring platform 601 communicates with the computing devices 602a and 602b of the taxable entities 606 via the network 603, for example, a short range network or a long range network. The network 603 is, for example, the internet, a local area network, a wide area network, a mobile communication network, etc. The computer system 700 comprises, for example, a processor 701, a memory unit 702 for storing programs and data, an input/output (I/O) controller 703, a network interface 704, a data bus 705, a display unit 706, input devices 707, a fixed media drive 708, a removable media drive 709 for receiving removable media, output devices 710, etc.

The processor 701 is an electronic circuit that executes computer programs. The memory unit 702 is used for storing programs, applications, and data. For example, the information acquisition module 601a, the tax form generation module 601d, the extraction module 601e, the processing module 601f, the comparison module 601g, the report generation module 601h, and the encryption module 601i are stored in the memory unit 702 of the computer system 700 of the tax monitoring platform 601. The memory unit 702 is, for example, a random access memory (RAM) or another type of dynamic storage device that stores information and instructions for execution by the processor 701. The memory unit 702 also stores temporary variables and other intermediate information used during execution of the instructions by the processor 701. The computer system 700 further comprises a read only memory (ROM) or another type of static storage device that stores static information and instructions for the processor 701.

The network interface 704 enables connection of the computer system 700 to the network 603. For example, the tax monitoring platform 601 connects to the network 603 via the network interface 704. The network interface 704 comprises, for example, an infrared (IR) interface, an interface that implements Wi-Fi™ of the Wireless Ethernet Compatibility Alliance, Inc., a universal serial bus (USB) interface, a local area network (LAN) interface, a wide area network (WAN) interface, etc. The I/O controller 703 controls the input and output actions performed by the taxable entities 606. The data bus 705 permits communications between the modules, for example, 601a, 601b, 601c, 601d, 601e, 601f, 601g, 601h, 601i, etc., of the tax monitoring platform 601.

The display unit 706 of the tax monitoring platform 601 displays, via the user interface 601j, for example, the dynamically generated tax forms for the taxable entities 606 to fill in the tax information, the tax information of the taxable entities 606 acquired by the tax monitoring platform 601, the errors determined in the acquired tax information, etc., to the taxable entities 606. The display unit 706 of the tax monitoring platform 601 displays, for example, user interface elements such as text fields for the taxable entities 606 to correct the errors indicated by the tax monitoring platform 601. The user interface elements displayed on the display unit 706 enable the taxable entities 606 to update the tax information during a change in the characteristic information of the taxable entities 606. The input devices 707 are used for inputting data into the computer system 700. The input devices 707 are, for example, a keyboard such as an alphanumeric keyboard, a joystick, a pointing device such as a computer mouse, a touch pad, a light pen, etc. The output devices 710 output the results of operations performed by the tax monitoring platform 601, on the computing devices 602a and 602b of the taxable entities 606. For example, the tax monitoring platform 601 may prompt the taxable entities 606 to fill in the mandated fields of the dynamically generated tax forms and may provide a pop-up alert when the taxable entities 606 fill in invalid values in the tax form, through the display unit 706.

Computer applications and programs are used for operating the computer system 700. The programs are loaded onto the fixed media drive 708 and into the memory unit 702 of the computer system 700 via the removable media drive 709. In an embodiment, the computer applications and programs may be loaded directly via the network 603. Computer applications and programs are executed by double clicking a related icon displayed on the display unit 706 using one of the input devices 707. The computer system 700 employs an operating system for performing multiple tasks. The operating system is responsible for management and coordination of activities and sharing of resources of the computer system 700. The operating system further manages security of the computer system 700, peripheral devices connected to the computer system 700, and network connections. The operating system employed on the computer system 700 recognizes, for example, inputs provided by an operator of the tax monitoring platform 601 using one of the input devices 707, the output display, files, and directories stored locally on the fixed media drive 708, for example, a hard drive. The operating system on the computer system 700 executes different programs using the processor 701.

The processor 701 retrieves the instructions for executing the modules, for example, 601a, 601b, 601d, 601e, 601f, 601g, 601h, 601i, etc., of the tax monitoring platform 601 from a program memory. A program counter determines the location of the instructions in the program memory. The program counter stores a number that identifies the current position in the program of the modules, for example, 601a, 601b, 601d, 601e, 601f, 601g, 601h, 601i, etc., of the tax monitoring platform 601. The instructions fetched by the processor 701 from the program memory after being processed are decoded. The instructions are placed in an instruction register in the processor 701. After processing and decoding, the processor 701 executes the instructions. For example, the database management system 601b defines instructions for storing, managing, and retrieving information on the tax liability and the tax deductions reported by the taxable entities 606. The database management system 601b also defines instructions for configuring a predetermined template for organizing the tax elements extracted from the acquired tax information of the taxable entities 606 in the database management system 601b, for enabling the comparison module 601g to determine the association between the first taxable entity 606a and the second taxable entities 606b, and for performing automated retrieval of the tax elements from the database management system 601b.

The tax form generation module 601d defines instructions for dynamically generating one or more tax forms specific to each of the taxable entities 606 based on characteristic information of the taxable entities 606 retrieved from multiple third party databases via the network 603. The information acquisition module 601a defines instructions for acquiring tax information filled into the dynamically generated tax forms by the taxable entities 606 via the user interface 601j and for storing the acquired tax information in the database management system 601b. The information acquisition module 601a defines instructions for updating the tax information in the database management system 601b on receipt of inputs from the taxable entities 606 via the user interface 601j about change in the characteristic information of the taxable entities 606.

The extraction module 601e defines instructions for extracting tax elements from the acquired tax information. The extraction module 601e defines instructions for extracting unique identification information of the taxable entities 606 from the acquired tax information stored in the database management system 601b and for transmitting the extracted unique identification information to a census authority via the network 603 for enabling the census authority to perform a population count operation. The processing module 601f defines instructions for transforming the extracted tax elements to conform to the predetermined template defined by the database management system 601b. The processing module 601f, in communication with the database management system 601b, defines instructions for identifying errors in the acquired tax information and for notifying the taxable entities 606 to correct the errors via the user interface 601j. The database management system 601b defines instructions for retrieving one or more tax elements extracted from the acquired tax information based on requests for the tax elements from one or more governing authorities 604 via the network 603, and for replicating the retrieved tax elements to one or more external databases associated with the governing authorities 604 via the network 603.

The comparison module 601g defines instructions for determining an association between a first taxable entity 606a and a second taxable entity 606b based on the extracted tax elements of each of the taxable entities 606. Furthermore, the comparison module 601g defines instructions for comparing the extracted tax elements of the first taxable entity 606a with the extracted tax elements of the second taxable entity 606b based on the association using the database management system 601b for determining accuracy of reporting of the tax information by the taxable entities 606 to verify the tax liability and the tax deductions reported by the taxable entities 606. The comparison module 601g defines instructions for identifying discrepancies in the acquired tax information while performing a comparison of the extracted tax elements of the first taxable entity 606a with the extracted tax elements of the second taxable entity 606b based on the association using the database management system 601b.

The report generation module 601h defines instructions for generating a report based on the comparison that determines the accuracy of reporting of the tax information, and for transmitting the generated report, for example, to one or more authorized tax entities 605, governing authorities 604, etc. Furthermore, the report generation module 601h defines instructions for updating the generated report based on the discrepancy information acquired externally, for example, from one or more authorized tax entities 605, governing authorities 604, etc., and for transmitting the updated report to one or more authorized tax entities 605, governing authorities 604, etc. The encryption module 601i defines instructions for encrypting the tax elements extracted from the acquired tax information prior to transmitting the d tax elements to one or more governing authorities 604 via the network 603.

The processor 701 of the computer system 700 employed by the tax monitoring platform 601 retrieves the instructions defined by the information acquisition module 601a, the database management system 601b, the tax form generation module 601d, the extraction module 601e, the processing module 601f, the comparison module 601g, the report generation module 601h, and the encryption module 601i and executes the instructions.

At the time of execution, the instructions stored in the instruction register are examined to determine the operations to be performed. The processor 701 then performs the specified operations. The operations include arithmetic and logic operations. The operating system performs multiple routines for performing a number of tasks required to assign the input devices 707, the output devices 710, and memory for execution of the modules, for example, 601a, 601b, 601d, 601e, 601f, 601g, 601h, 601i, etc., of the tax monitoring platform 601 and to data used by the tax monitoring platform 601, moving data between the memory unit 702 and disk units, and handling input/output operations. The operating system performs the tasks on request by the operations and after performing the tasks, the operating system transfers the execution control back to the processor 701. The processor 701 continues the execution to obtain one or more outputs. The outputs of the execution of the modules, for example, 601a, 601b, 601d, 601e, 601f, 601g, 601h, 601i, etc., of the tax monitoring platform 601 are displayed to the user via the user interface 601j on the display unit 706.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 701, except for a transitory, propagating signal.

The computer program product disclosed herein comprises multiple computer program codes for verifying tax liability and tax deductions of taxable entities 606. For example, the computer program product disclosed herein comprises a first computer program code for enabling the tax monitoring platform 601 comprising the database management system 601b to store, manage, and retrieve information on the tax liability and the tax deductions reported by the taxable entities 606; a second computer program code for dynamically generating one or more tax forms specific to each of the taxable entities 606 based on characteristic information of the taxable entities 606 retrieved, for example, from multiple third party databases via the network 603; a third computer program code for acquiring tax information filled into the dynamically generated tax forms by the taxable entities 606 via the user interface 601j, and for storing the acquired tax information in the database management system 601b; a fourth computer program code for extracting tax elements from the acquired tax information and transforming the extracted tax elements to conform to the predetermined template defined by the database management system 601b; a fifth computer program code for determining an association between a first taxable entity 606a and a second taxable entity 606b based on the extracted tax elements of each of the taxable entities 606 using the database management system 601b; and a sixth computer program code for comparing the extracted tax elements of the first taxable entity 606a with the extracted tax elements of the second taxable entity 606b based on the association using the database management system 601b for determining accuracy of reporting of the tax information by the taxable entities 606.

The computer program product disclosed herein further comprises computer program codes for generating a report based on the comparison and for transmitting the generated report, for example, to one or more of an authorized tax entity 605, governing authorities 604, etc. The computer program product disclosed herein further comprises additional computer program codes for performing additional steps that may be required and contemplated for verifying tax liability and tax deductions of the taxable entities 606.

The computer program codes comprising the computer executable instructions are embodied on the non-transitory computer readable storage medium. The processor 701 of the computer system 700 retrieves these computer executable instructions and executes them. When the computer executable instructions are executed by the processor 701, the computer executable instructions cause the processor 701 to perform the method steps for verifying tax liability and tax deductions of the taxable entities 606. In an embodiment, a single piece of computer program code comprising computer executable instructions performs one or more steps of the computer implemented method disclosed herein for verifying tax liability and tax deductions of the taxable entities 606.

Figure 8:
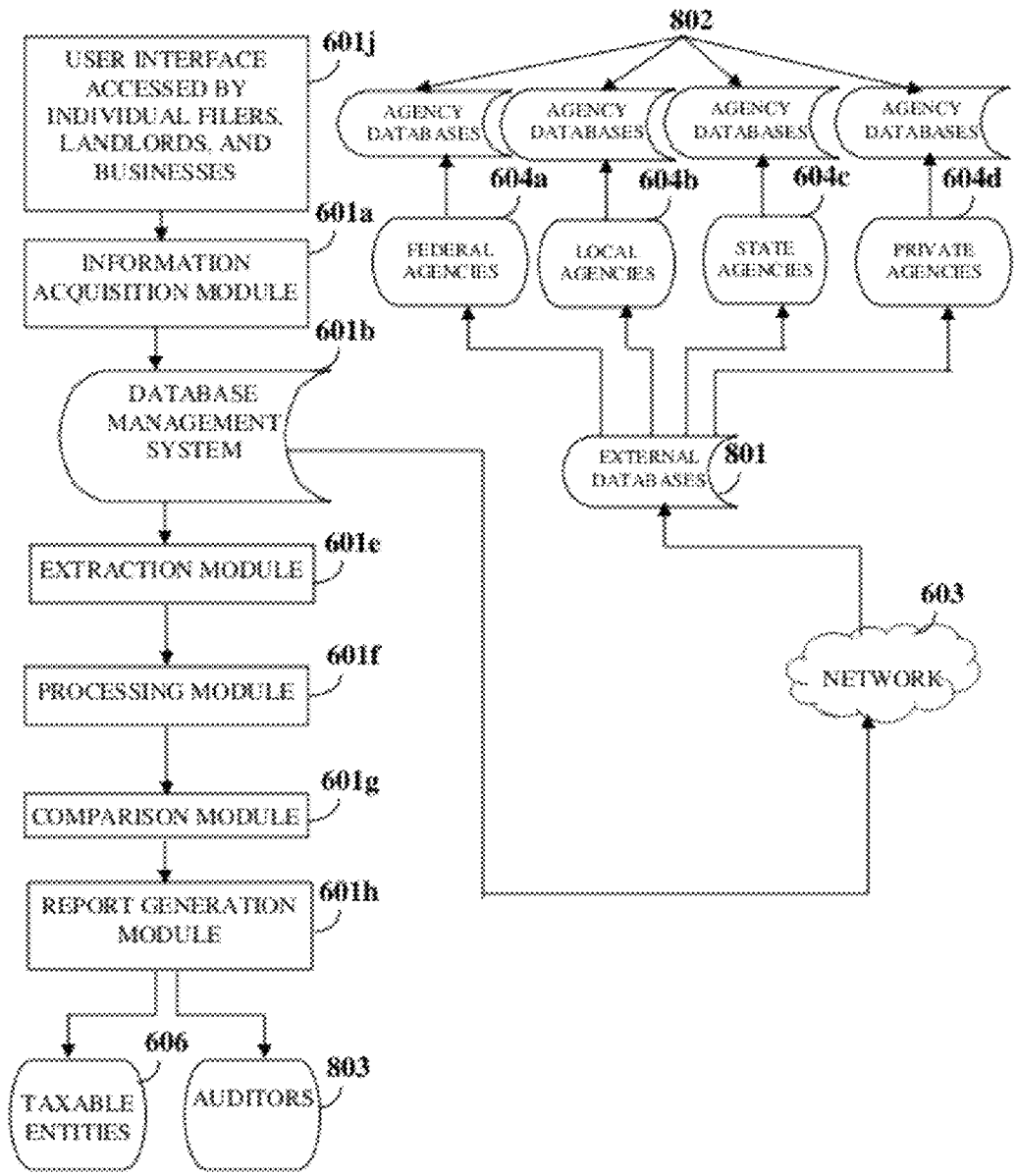
FIG. 8 exemplarily illustrates the steps performed by modules of the computer implemented system for verifying tax liability and tax deductions reported by taxable entities.

FIG. 8 exemplarily illustrates the steps performed by the modules 601a, 601b, 601e, 601f, 601g, 601h, etc., of the computer implemented system 600 exemplarily illustrated in FIG. 6, for verifying tax liability and tax deductions reported by taxable entities 606. Consider an example where taxable entities 606, for example, individual tax filers, landlords, and businesses submit tax information using the dynamically generated tax forms to the tax monitoring platform 601. The taxable entities 606 may fill the tax forms offline and then submit the tax information to the tax monitoring platform 601 via the network 603, or may complete the tax forms online via the user interface 601j of the tax monitoring platform 601. The information acquisition module 601a of the tax monitoring platform 601 acquires the tax information via the user interface 601j and stores the acquired tax information in the database management system 601b.

The extraction module 601e of the tax monitoring platform 601 extracts the tax elements from the tax information stored in the database 601c of the database management system 601b. The processing module 601f transforms the extracted tax elements to conform to the predetermined logical template defined by the database management system 601b to meet the operational needs of loading the data into the database 601c of the database management system 601b. For example, the processing module 601f converts the extracted tax elements such as the lease date specified for a leased residence on a property to the predetermined month/date/year (MM/DD/YYYY) template. Further, in order to load the data into the database 601c of the database management system 601b, the data is transformed to match the data model defined for the database 601c. For example, the database 601c is designed in accordance with a relational database model employing the structured query language (SQL) for managing data. The extracted tax elements are recorded as entries that are organized into SQL tables.

The comparison module 601g, in communication with the database management system 601b, analyzes the tax elements in the database 601c for verifying the tax information reported by the taxable entities 606. The comparison module 601g performs a comparison by utilizing a data model as disclosed in the detailed description of FIGS. 9A-9E. The comparison module 601g verifies, for example, the rental incomes reported by the landlord with the rental payments reported by the tenant and identifies discrepancies in the tax information submitted by the landlord and the tenant. The comparison module 601g provides the result of the comparison to the report generation module 601h. The report generation module 601h generates a report based on the results received from the comparison module 601g. The report generation module 601h transmits the report, for example, to an auditor 803 and notifies the discrepancies to the taxable entities 606.

The tax monitoring platform 601 replicates the tax elements extracted from the tax information in the database 601c to external databases 801 of governing authorities 604, for example, the agency databases 802 of federal agencies 604a, local agencies 604b, state agencies 604c, private agencies 604d, etc. The tax monitoring platform 601 and the external databases 801 employ the database management system 601b to allow requested data to be replicated to the external databases 801. For each of the agencies 604a, 604b, 604c, and 604d, the tax monitoring platform 601 determines what data will be replicated to the external databases 801. Each of the agencies 604a, 604b, 604c, and 604d can use that data to meet its operational needs. For example, the census bureau can use the data provided by the tax monitoring platform 601 to identify inconsistencies in its databases. The database management system 601b updates the external databases 801 of governing authorities 604 via the network 603. If the governing authorities 604 detect inconsistencies that tax collection agencies should be aware of, the governing authorities 604 can provide that information to the tax collection agencies.

FIGS. 9A-9E exemplarily illustrate an entity relationship diagram of a data model employed by the database management system 601b of the tax monitoring platform 601 exemplarily illustrated in FIG. 6, for managing the tax information of taxable entities 606 and enabling verification of tax liability and tax deductions reported by the taxable entities 606. The data model is, for example, a relational database model employing the structured query language (SQL). The database management system 601b configures a predetermined template that enables organizing, managing and retrieving tax elements stored in the database 601c of the database management system 601b. The data model represents a subset of database entities and attributes that are required for implementation of the computer implemented method disclosed in the detailed description of FIG. 5. As used herein, the term "database entity" refers to an independent database object that encapsulates specific elements of the tax information acquired from the taxable entities 606. As used herein, the term "attribute" refers to an element or a component of a database entity that defines a particular aspect of the tax information.

As additional reports are developed, the data model is modified to incorporate additional database entities and attributes for the data model. Each database entity represents a set of tax elements extracted from the tax information or a description of the characteristics of the tax elements. Each database entity is characterized by a table in the database 601c. The individual tax elements are the attributes of the database entity in accordance with the terminology of the data model. The database management system 601b distributes the extracted tax elements to tables characterizing the database entities. Each tax element is represented as a column in the table characterizing a database entity. The database management system 601b establishes associations between the database entities by selecting and linking columns of associated tables.

The tax monitoring platform 601 extracts the tax elements from the tax information reported by the taxable entities 606 on a taxable object, for example, a property, a service, a product, etc. The database management system 601b separates the tax elements extracted from the tax information of the taxable entities 606 and groups the tax elements to a particular database entity.

Figure 9A:
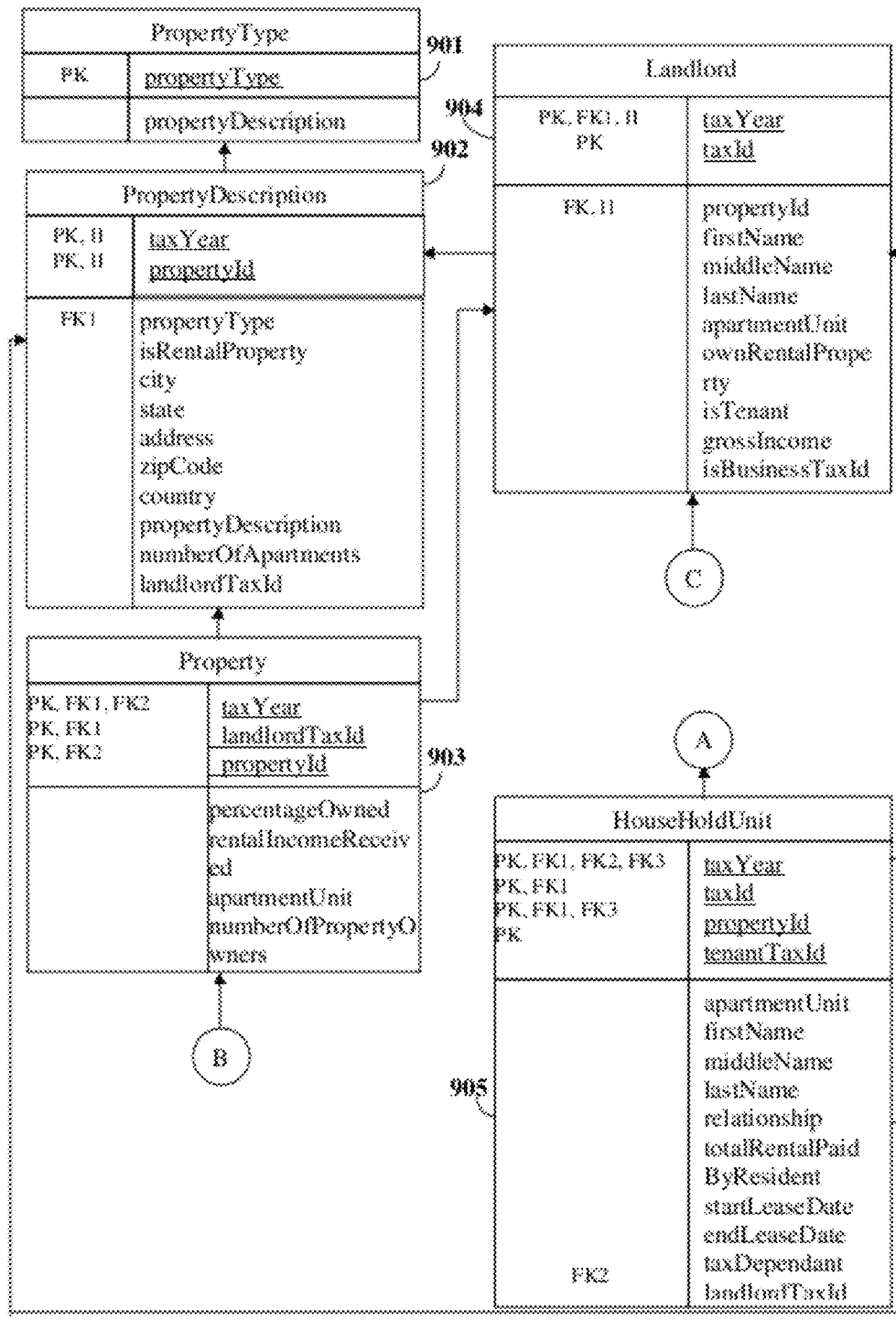

Consider an example where the taxable object is a property, the first taxable entity 606a is an owner of a property, and the second taxable entity 606b is a tenant residing in a leased residence on the property. The database entity "PropertyType" 901, exemplarily illustrated in FIG. 9A, represents the set of tax elements that uniquely identify the type of property, for example, whether the property is an apartment, etc. The database entity "PropertyDescription" 902, exemplarily illustrated in FIG. 9A, represents the set of tax elements describing the characteristic information of the property, for example, the address of the property, the number of apartments, etc. The database entity "Property" 903, exemplarily illustrated in FIG. 9A, represents the set of tax elements that describe the property utilization and transaction details reported by the property owner, for example, the percentage of the property owned, the rental income received on the property, number of property owners, etc. The database entity "Landlord" 904, exemplarily illustrated in FIG. 9A, represents the set of tax elements characterizing the personal information of the property owner, for example, the landlord. The database entity "HouseholdUnit" 905, exemplarily illustrated in FIG. 9A, represents the set of tax elements that are acquired from a tenant and that describe the information on the household, that is, all residents residing in the same residence as the tenant, for example, information on the relationship between the tenant and the other residents, the rental payments contributed by the individual residents, the start lease date, the end lease date, etc.

The database entity "ReportedTenantsByLandlord" 906, exemplarily illustrated in FIG. 9B, represents the set of tax elements extracted from the tax information reported by the property owner that identify the tenants and describe the contractual information agreed with the tenants on the utilization of the property, for example, the lease period. The database entity "IndividualFiler" 907, exemplarily illustrated in FIG. 9C, represents the set of tax elements that characterize the personal information and the income information of a taxable entity 606a or 606b such as an individual. In this example, the tax elements of the database entity "IndividualFiler" 907 characterize the personal information of a tenant.

Figure 9D:
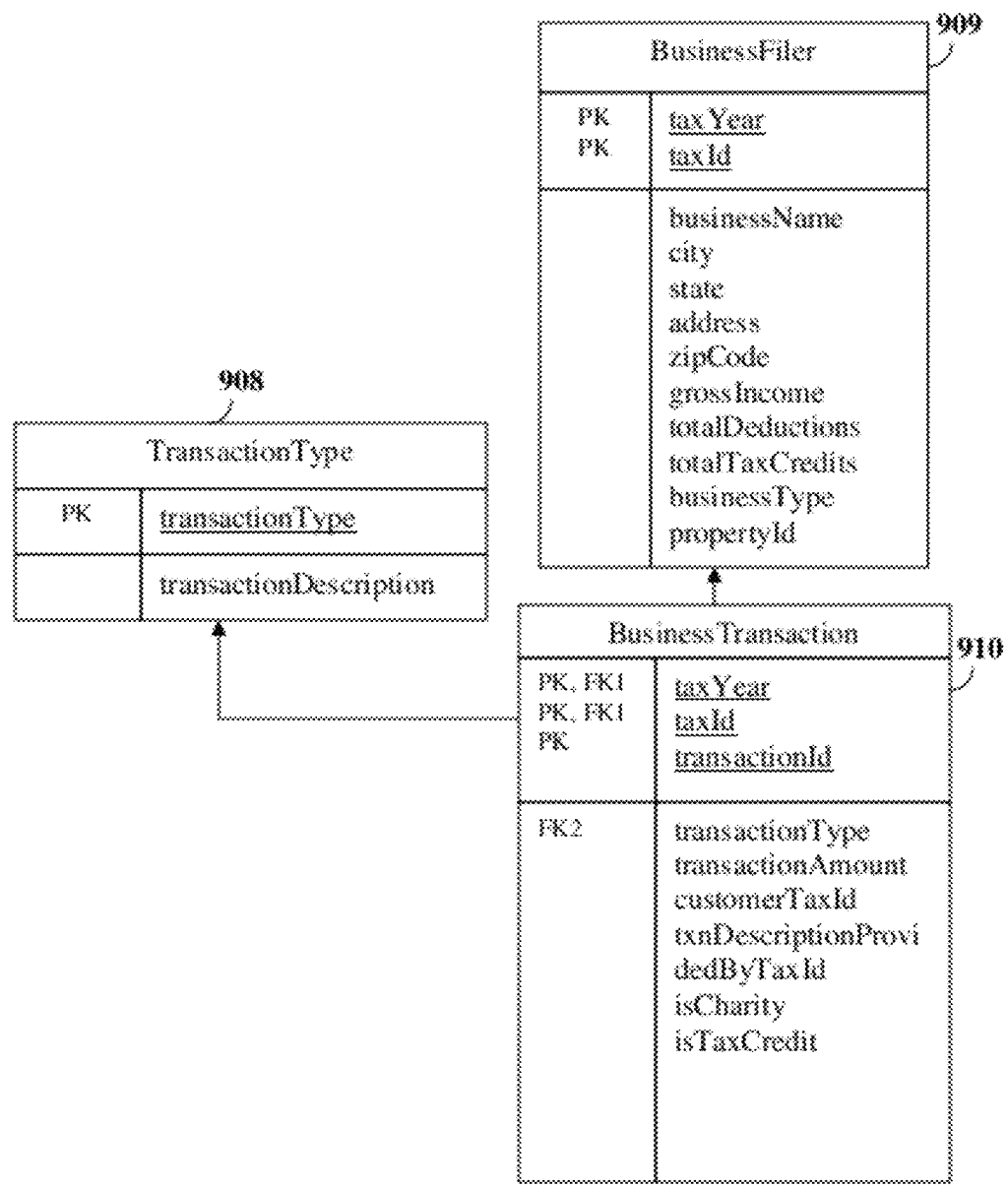

Consider an example where the taxable object is a service or a product, the first taxable entity 606a is an owner of the business rendering the service or the product, and the second taxable entity 606b is a customer rendering a payment to the owner of the business in return for receiving the service. The database entity "TransactionType" 908, exemplarily illustrated in FIG. 9D, represents a description of the nature of the business transaction. The database entity "BusinessFiler" 909, exemplarily illustrated in FIG. 9D, represents the set of tax elements that denote the characteristic information of the taxable entities 606 and the taxable object. The extraction module 601e exemplarily illustrated in FIG. 6 collects the tax elements, for example, the name of the business organization, the address of the business organization, the business tax identification number of the owner of the business, gross income, the deductions claimed, etc., and maps these tax elements to the database entity "BusinessFiler" 909. For each taxable entity 606a or 606b in a household, the tax identification number will be used to retrieve information from the database entity "BusinessFiler" 909. The database entity "BusinessTransaction" 910, exemplarily illustrated in FIG. 9D, represents the set of tax elements that correspond to the information on the business transaction conducted by the taxable entity 606a such as a vendor with an associated taxable entity 606b such as a customer.

Figure 9E:
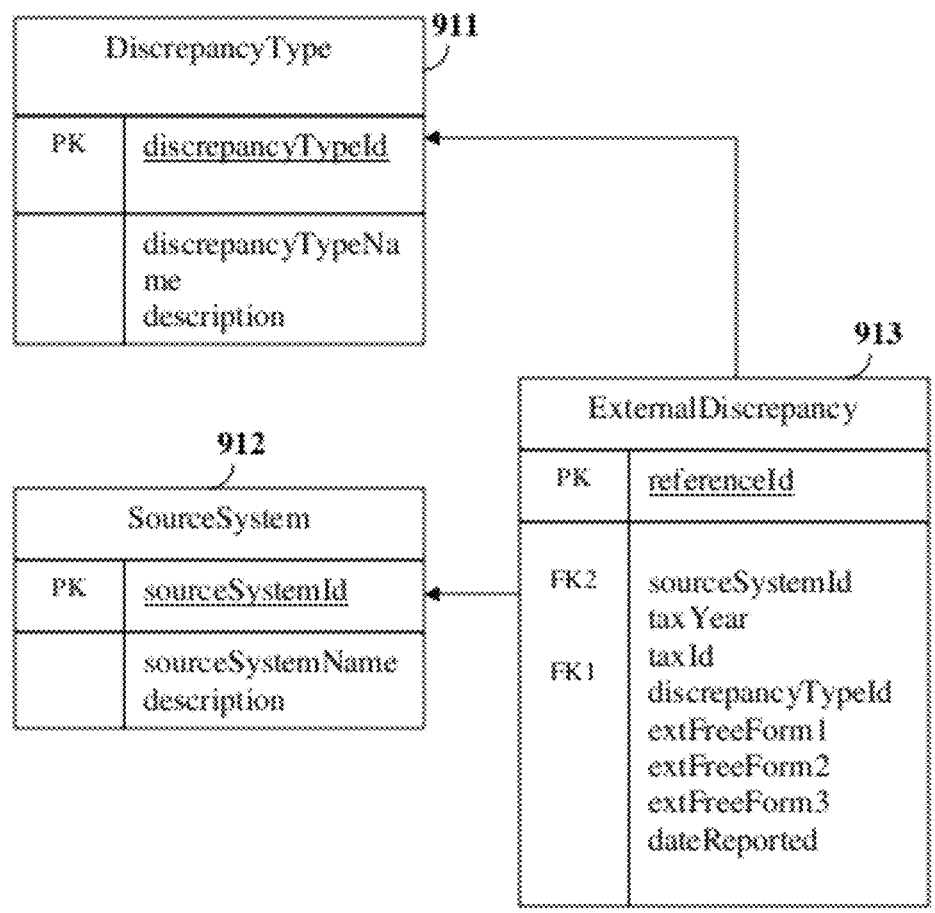

Furthermore, the computer implemented method and system 600 disclosed herein comprises identifying discrepancy information that is either determined locally, or received from an external source. The tax monitoring platform 601 receives discrepancy information from an external source, for example, a governing authority 604. The discrepancy information is separated into the information on the source generating the discrepancy report, the characteristic information of the discrepancy, and information on the taxable entities 606 against whom the discrepancy is reported. The database entity "discrepancyType" 911, exemplarily illustrated in FIG. 9E, describes the nature of the discrepancy. The database entity "SourceSystem" 912, exemplarily illustrated in FIG. 9E, represents the set of tax elements that describe the source generating the discrepancy report. The database entity "ExternalDiscrepancy" 913, exemplarily illustrated in FIG. 9E, represents the set of tax elements that describe the discrepancy information reported for the taxable entities 606 from an external source.

The individual tax elements constituting each of the database entities in the data model are disclosed herein. Consider the database entity "PropertyType" 901 exemplarily illustrated in FIG. 9A. The attribute "propertyType" denotes the unique system generated identification number that identifies the type of property. The attribute "propertyDescription" provides a description for the type of property. For each property, attribute "propertyDescription" will be used to obtain a description for the property. Consider the database entity "PropertyDescription" 902 exemplarily illustrated in FIG. 9A. The attribute "taxYear" indicates the year for the tax filing period. The attribute "propertyId" denotes the unique system generated identification number that is used to represent a property. The attribute "propertyType" denotes a mnemonic, for example, "APT BLDG" that represents an apartment building, indicating the type of property. The attribute "isRentalProperty" denotes an indicator that indicates that the property is used for rental purposes. The attribute "city" denotes the name of the city where the property is located. The attribute "state" denotes the name of the state where the property is located. The attribute "address" denotes the name of the location where the property is located. The attribute "zipCode" denotes the zip code for the location. The attribute "country" denotes the name of the country where the property is located. The attribute "propertyDescription" denotes a free form field that the landlord uses to describe the property. The attribute "numberOfApartments" denotes the number of apartments and offices that are a part of the building. The attribute "landlordTaxId" denotes the tax identification number of the landlord of the property.

Consider the database entity "Property" 903 exemplarily illustrated in FIG. 9A. The attribute "taxYear" indicates the year for the tax filing period. The attribute "landlordTaxId" denotes the unique tax identification number for the landlord or the business. The attribute "propertyId" denotes the unique system generated identification number used to identify a property. The attribute "percentageOwned" denotes the percentage of the rental income that the landlord receives from the total rental income for the apartment. The attribute "rentalIncomeReceived" denotes the total amount of rental income that the landlord has received for the apartment. The attribute "apartmentUnit" denotes the apartment number. The attribute "numberOfPropertyOwners" denotes the number of owners who have invested in the apartment.

Consider the database entity "Landlord" 904 exemplarily illustrated in FIG. 9A. The attribute "taxYear" indicates the year for the tax filing period. The attribute "taxId" denotes the tax identification number for the tax filer. The attribute "propertyId" denotes the unique system generated number that identifies the primary residence for the taxId. The attribute "apartmentUnit" indicates the apartment number for the tax filer. The attribute "apartmentUnit" specifies that if the primary residence is an apartment, the value of the attribute indicates the apartment number. The attribute "firstName" denotes the first name of the tax filer. The attribute "middleName" denotes the middle name of the tax filer. The attribute "lastName" denotes the last name of the tax filer. The attribute "ownRentalProperty" denotes an indicator that is used to identify the tax filer as an owner of a rental property. The attribute "grossIncome" denotes the gross income for the tax filer. The attribute "isBusinessTaxId" denotes an indicator that is used to identify the taxId as being applicable to a business. The attribute "isTenant" denotes an indicator that states that the tax filer has leased property for the tax year.

Consider the database entity "HouseholdUnit" 905 exemplarily illustrated in FIG. 9A. The attribute "taxYear" denotes the year for the tax filing period. The attribute "taxId" denotes the tax identification number of the individual that reported residence information for the person identified by the attribute "tenantTaxId" in the household. The attribute "propertyId" denotes a unique system generated identification number that is used to identify a property. The attribute "tenantTaxId" denotes the tax identification number of the individual who resides in the household. The attribute "apartmentUnit" identifies the apartment or office in the building if the property has apartments or offices. The attribute "firstName" denotes for a tenantTaxId, the first name of the person. The attribute "middleName" denotes for a tenantTaxId, the middle name of the person. The attribute "middleName" denotes for a tenantTaxId, the last name of the person. The attribute "relationship" defines the relationship between the tenant identified by the taxId and the resident identified by the tenantTaxId. The attribute "totalRentalPaidByResident" denotes the total amount of rental payments that a resident identified by the tenantTaxId paid to reside in the household. The attribute "startLeaseDate" denotes the date from which the resident identified by the tenantTaxId began residence in the household. The attribute "endLeaseDate" denotes the date on which the resident identified by the tenantTaxId terminated residence in the household. The attribute "taxDependant" denotes whether the resident identified by the tenantTaxId is a dependant of the resident identified by the taxId. The attribute "landlordTaxId" denotes the tax identification number for the landlord of the property.

Consider the database entity "ReportedTenantsByLandlord" 906 exemplarily illustrated in FIG. 9B. The attribute "taxYear" indicates the year for the tax filing period. The attribute "landlordTaxId" denotes the tax identification number for the landlord. The attribute "propertyId" denotes the unique system generated identification number that identifies the property that the tenant has leased. The attribute "apartmentUnit" identifies the apartment or the office that tenant has leased. The attribute "tenantTaxId" denotes the tenant's tax identification number. The attribute "tenantFirstName" denotes the first name of the tenant. The attribute "tenantMiddleName" denotes the middle name of the tenant. The attribute "tenantLastName" denotes the last name of the tenant. The attribute "leaseStartDate" denotes the start date for the lease. The attribute "leaseEndDate" denotes the termination date for the lease. The attribute "tenantGrossIncome" denotes the gross income that was provided by the tenant.

Consider the database entity "IndividualFiler" 907 exemplarily illustrated in FIG. 9C. The attribute "taxYear" indicates the year for the tax filing period. The attribute "taxId" denotes the tax identification number for the tax filer. The attribute "propertyId" denotes the unique system generated number that identifies the primary residence for a taxable entity 606a or 606b identified by the taxId. The attribute "apartmentUnit" indicates the apartment number for the tax filer. The attribute "apartmentUnit" denotes that if the primary residence is an apartment, the value of the attribute indicates the apartment number. The attribute "firstName" denotes the first name of the tax filer. The attribute "middleName" denotes the middle name of the tax filer. The attribute "lastName" denotes the last name for the tax filer. The attribute "ownRentalProperty" denotes an indicator that is used to identify the tax filer as an owner of a rental property. The attribute "grossIncome" denotes the gross income earned by the tax filer. The attribute "isBusinessTaxId" denotes an indicator that is used to identify the taxId as an identification number associated with a business. The attribute "isTenant" denotes an indicator that states that the tax filer has leased property for the tax year.

Consider the database entity "TransactionType" 908 exemplarily illustrated in FIG. 9D. The attribute "transactionType" defines a mnemonic signifying the type of transaction. The attribute "transactionDescription" describes the type of transaction conducted between two taxable entities 606, for example, whether a service or product was bought or sold. Consider the database entity "BusinessFiler" 909 exemplarily illustrated in FIG. 9D. The attribute "taxYear" indicates the year for the tax filing period. The attribute "taxId" denotes the tax identification number for a business. The attribute businessName denotes the name of the business. The attribute "city" denotes the name of the city where the business is located. The attribute "state" denotes the name of the state where the business is located. The attribute "address" denotes the name of the geographical area where the business is located. The attribute "zipCode" denotes the zip code of the area where the business is located. The attribute "grossIncome" denotes the gross income for the business for the tax year. The attribute "totalDeductions" denotes the total amount of tax deductions claimed by the business for the tax year. The attribute "totalTaxCredits" denotes the total amount of tax credits for the tax year. The attribute "businessType" denotes the unique system generated identification number that is used to classify the business on the basis of the specific type of services rendered, for example, as a charity organization, an information technology (IT) consulting company, etc. The attribute "propertyId" denotes the unique system generated identification number that is used to represent a property.

Consider the database entity "BusinessTransaction" 910 exemplarily illustrated in FIG. 9D. The attribute "taxYear" indicates the year for the tax filing period. The attribute "taxId" denotes the tax identification number of a taxable entity 606a, for example, a business or an individual that filed the business transaction. The attribute "transactionType" identifies the type of business transaction that is carried out with another taxable entity 606b. The attribute "transactionType" can also be used to determine if the business transaction generated revenue for the taxable entity 606a identified by the "taxId" or if the business transaction resulted in expenditure in terms of payment rendered during the business transaction. The attribute "transactionAmount" denotes the monetary value for completing the business transaction between a taxable entity 606a identified by the "taxId" and a taxable entity 606b identified by the "customerTaxId". The attribute "customerTaxId" identifies the other party in the business transaction. The attribute "txnDescriptionProvidedByTaxId" denotes a free form field that allows the tax filer to describe the business transaction between a taxable entity 606a identified by "taxId" and a taxable entity 606b identified by the "customerTaxId". The attribute "isCharity" denotes an indicator that all or part of the financial transaction qualifies as a charitable tax deduction. The attribute "isTaxCredit" denotes an indicator that all or part of the financial transaction qualifies as a tax credit deduction.

Consider the database entity "DiscrepancyType" 911 exemplarily illustrated in FIG. 9E. The attribute "discrepancyTypeId" denotes a unique identifier associated with the type of discrepancy that has been detected. The attribute "discrepancyTypeName" denotes a mnemonic for the discrepancy. The attribute "description" provides a description of the discrepancy. Consider the database entity "SourceSystem" 912 exemplarily illustrated in FIG. 9E. The attribute "sourceSystemId" denotes the unique generated system identification number that is used to identify an external agency, for example, social security. The attribute "sourceSystemName" denotes a mnemonic for the external agency. The attribute "description" specifies a description for the agency. Consider the database entity "ExternalDiscrepancy" 913 exemplarily illustrated in FIG. 9E. The attribute "referenceId" denotes the unique system generated identification number that identifies a discrepancy that has been identified by an external agency. The attribute "sourceSystemId" denotes the unique system generated identification number that identifies an external agency, for example, the federal bureau of investigation (FBI), a social security agency, etc. The attribute "taxYear" denotes the year for the tax filing period. The attribute "taxId" denotes the tax identification number for the individual or the business that has external discrepancies. The attribute "discrepancyTypeId" denotes the unique system generated number that identifies the type of discrepancy. The attributes "extFreeForm1", "extFreeForm2", and "extFreeForm3" allows an external agency, for example, a governing authority 604 to provide additional information about the discrepancy to the tax collection agency that employs the tax monitoring platform 601. The attribute "dateReported" denotes the date that the discrepancy was reported by the external agency.

FIGS. 10A-10M exemplarily illustrate tables depicting the relationship between the individual database entities of the data model employed by the database management system 601b exemplarily illustrated in FIG. 6. The database management system 601b determines the association between the taxable entities 606 and the taxable object for verification of tax liability and tax deductions of the taxable entities 606 based on the relations between the individual tables.

FIGS. 11A-11J exemplarily illustrate verification of tax liability and tax deductions reported on a taxable object by multiple taxable entities 606, using computer programs and tables implemented by the tax monitoring platform 601 exemplarily illustrated in FIG. 6. The tax monitoring platform 601 utilizes the data model disclosed in the detailed description of FIGS. 9A-9E. The computer programs comprise, for example, standard structured query language (SQL) commands that are used to retrieve the tax elements from the database 601c of the database management system 601b.

FIG. 11A exemplarily illustrates an SQL based computer program for verifying tax liability and tax deductions reported on a property by a first taxable entity 606a, for example, a landlord, and a second taxable entity 606b, for example, a tenant residing in a leased residence on the property. The database management system 601b selects the tables comprising the tax elements that are necessary to determine an association between the taxable entities 606.

The database management system 601b establishes an association between the taxable entities 606 for comparing the tax information of the associated taxable entities 606, based on the tax elements that are represented as columns in each of the tables. For example, the database management system 601b selects the columns corresponding to the tax elements "taxYear" and the "taxId" of the database entity "Landlord" 904 exemplarily illustrated in FIG. 9A, the columns corresponding to the tax elements "propertyId", "rentalIncomeReceived", and "apartmentUnit" of the database entity "Property" 903 exemplarily illustrated in FIG. 9A, the column corresponding to the tax element "taxId", and the column corresponding to the tax element "totalRentalPaidByResident" of the database entity "HouseholdUnit" 905 exemplarily illustrated in FIG. 9A. The database management system 601b joins the columns of the database entity "Property" 903 and the columns of the database entity "HouseholdUnit" 905 to determine an association. The database management system 601b performs a search based on the search condition that the property identification information and the tax year information specified by the landlord that is stored in the database entity "Property" 903, matches the property identification information and the tax year information specified by the tenant and stored in the database entity "HouseholdUnit" 905. Therefore, the results of the search collectively represent information received from the tenants and the landlords on a property, and establish an association between each of the tenants and the landlords with the property. The database management system 601b creates a result set that contains the taxYear, taxId, propertyId, rentalIncomeReceived, and apartmentUnit.

The database management system 601b establishes an association between an individual landlord and the tenants, and verifies the total rental income reported by the landlord with the total rental payments reported by the tenants. The database management system 601b establishes the association by comparing the "taxId" and the "taxYear" reported by the landlord and stored in the database entity "Landlord" 904 with the "landlordTaxId" and the "taxYear" reported by the tenant and stored in the database entity "Property" 903. On finding a match, the database management system 601b compares the "rentalIncomeReceived" reported by the landlord with the sum of the total rental payments collected from all the tenants, that is, the "totalRentalPaidByResident" to determine the accuracy of reporting of the tax information by the landlord and the tenants. The database management system 601b creates a result set that contains the propertyId, taxYear, taxId of the landlord, rentalIncomeReceived, apartmentUnit, and the taxId of the tenant to identify the taxable entities 606 whose tax information is found to have discrepancies.

FIGS. 11B-11E exemplarily illustrate a working example that utilizes the computer program exemplarily illustrated in FIG. 11A for verifying the tax information reported by the taxable entities 606 on a property. The example references the data model disclosed in the detailed description of FIGS. 9A-9E. FIG. 11B is a table representing the database entity "HouseholdUnit" 905 exemplarily illustrated in FIG. 9A. The table comprises the tax information reported by a second taxable entity 606b, for example, the tenant "Will Godwin". The tax information comprises the unique identification information of the tenant represented by the column taxId, the property identification information represented by the column propertyId, the names of the other residents in the household, the relationship between the tenant Will Godwin and the other residents, the lease duration, the individual rent paid by each of the residents, the landlord's taxId, etc. The rent paid by each of the residents is totaled to compute the cumulative rent for the household. Therefore, the total rent paid by all the residents for the propertyId "1" is the sum of $2500 and $1000, which adds up to $3500. FIG. 11C exemplarily illustrates a table representing the database entity "Landlord" 904 exemplarily illustrated in FIG. 9A. The table exemplarily illustrated in FIG. 11C comprises information on the individual owners of different properties, the unique identification information of the properties, etc. The table comprises the unique identification information of the owner of the property that is utilized by the tenant Will Godwin.

FIG. 11D exemplarily illustrates a table representing the database entity "Property" 903 exemplarily illustrated in FIG. 9A. The table comprises the unique identification information of the property owners represented by the "landlordTaxId", the total rental income received for the property by the property owners, etc. FIG. 11E exemplarily illustrates a result set created by the database management system 601b by associating the tables exemplarily illustrated in FIGS. 11B-11D. The database management system 601b determines the association between the landlord identified by the taxId "111111111" and the tenant Will Godwin with the tenantTaxId "2001" based on the matches for each of the tax elements "tax year" and "propertyId". The database management system 601b compares the "rentalIncomeReceived" column with the "Sum(totalRentalPaidByResident)" column. The database management system 601b verifies that the rental income reported on a property with the "propertyId" 1 by the landlord identified by the taxId "111111111" is $5000 which does not match the sum of the "totalRentalPaidByResident" for the "propertyId" 1 reported as $3500 by the tenant Will Godwin. Due to this discrepancy, the tax monitoring platform 601 automatically notifies the property owner and the tenant of the discrepancy and requests the property owner and the tenant to confirm that the information is accurate. The tenant and the property owner may respond to the request via the user interface 601j.

FIG. 11F exemplarily illustrates an SQL based computer program for verifying tax liability and tax deductions reported by a first taxable entity 606a, for example, a vendor offering a service, and a second taxable entity 606b, for example, a customer who receives the service in return for payments made to the vendor. The database management system 601b inserts the business transaction information provided as part of the tax information by each of the taxable entities 606 to the table representing the database entity "BusinessTransaction" 910 exemplarily illustrated in FIG. 9D. The database management system 601b selects the columns businessName from the database entity "Business- Filer" 909, and the customerTaxId, the transactionId, the transactionDescription, the transactionAmount, and the transactionType from the database entity BusinessTransaction 910. The database management system 601b determines an association between the vendor and the customer by checking for a match between the columns taxId and the customerTaxId of the taxable entities 606. For example, on finding that the customerTaxId reported by the first taxable entity 606a that is, the vendor, is equal to the taxId of another taxable entity 606b, the database management system 601b establishes a relation between the taxable entities 606a and 606b.

The database management system 601b checks for a match between each of the transactionId and the taxYear reported by the taxable entities 606, and a non equivalence in the transactionType between the taxable entities 606 to complete the association between the taxable entities 606 and the transaction between the taxable entities 606. The database management system 601b selects the rows of the table corresponding to matches in the columns taxYear and taxId of the database entity "BusinessTransaction" 910 and the database entity "BusinessFiler" 909. Further, the database management system 601b checks whether that the transactionAmount reported by the first taxable entity 606a is unequal to the transactionAmount reported by the second taxable entity 606b. The database management system 601b creates a result set comprising the transactionAmount, taxYear, taxId, and the transactionId information of the taxable entities 606 in whose tax information discrepancies were determined.

FIGS. 11G-11J exemplarily illustrate a working example that utilizes the computer program disclosed in the detailed description of FIG. 11F for verifying the tax information reported by the taxable entities 606 on a business transaction. FIG. 11G exemplarily illustrates a table representing the database entity "BusinessFiler" 909 as disclosed in the detailed description of FIGS. 9A-9E. The table comprises the tax information acquired from the taxable entities 606, for example, owners of businesses "b1" and "b2", with the business tax identification numbers "b1" and "b2" respectively. The taxYear attribute denotes the year of filing of the tax information that is indicated to be 2011 for both the businesses.

FIG. 11H exemplarily illustrates a table representing the database entity "BusinessTransaction" 910 as disclosed in the detailed description of FIGS. 9A-9E. The table comprises information on the nature of the business transaction as represented by the attribute or the column "transactionType". The meaning of the attribute transactionType is derived from the attribute "transactionDescription" indicated in FIG. 11I. A transactionType value equal to 1 indicates that a service or a product was bought by the taxable entity 606b that reported the tax information, while a transactionType value equal to 2 indicates that a service or a product was sold by the taxable entity 606a reporting the tax information.

As exemplarily illustrated in FIG. 11H, the two business owners "b1" and "b2" mutually buy and sell products to each other. Consider an example where business "b1" is a manufacturer of a wireless networking hardware unit, and business "b2" is a manufacturer of software programs that enable the operation of a wireless networking hardware unit. The business "b1" sells the wireless networking hardware unit to "b2" to allow the business "b2" to test the software programs manufactured by "b2", and the business "b2" sells the software programs to the business "b1" for the operation of the wireless networking hardware unit. Each of the business transactions between the businesses "b1" and "b2" is identified uniquely by the column transactionId. The database management system 601b checks the "transactionId" to verify that the two businesses are reporting the same business transaction. For example, business "b1" with the taxId "b1" buys a product from the business "b2" with the customerTaxId "b2" for a "transactionAmount" of $10000, and a "transactionId" of 1. The business "b2" sells a product to the business "b1" with the customerTaxId "b1" at a "transactionAmount" of $7500 and a "transactionId" of 5.

FIG. 11I exemplarily illustrates a table that indicates whether a service or a product was bought or sold. FIG. 11J exemplarily illustrates a result set obtained from the tables in FIG. 11G, FIG. 11H, and FIG. 11I by the tax monitoring platform 601. The result set comprises information on the business transactions that have been found to have discrepancies. For example, for the business transaction with the "transactionId" equal to 5, the business with the taxId "b2" reports a transaction amount of $7500 for selling a product to the business with the "customerTaxId" b1, whereas the business b1 reports that the business b1 bought the product from the business b2 for a transaction amount of $15000. In another example, the business b2 with the taxId "b2" reports a transaction amount of $20000 for buying a product from business b1 with the customerTaxId b1 at a transactionId of 2. However, business b1 does not report a business transaction with the transactionId 2.

Figure 12A:
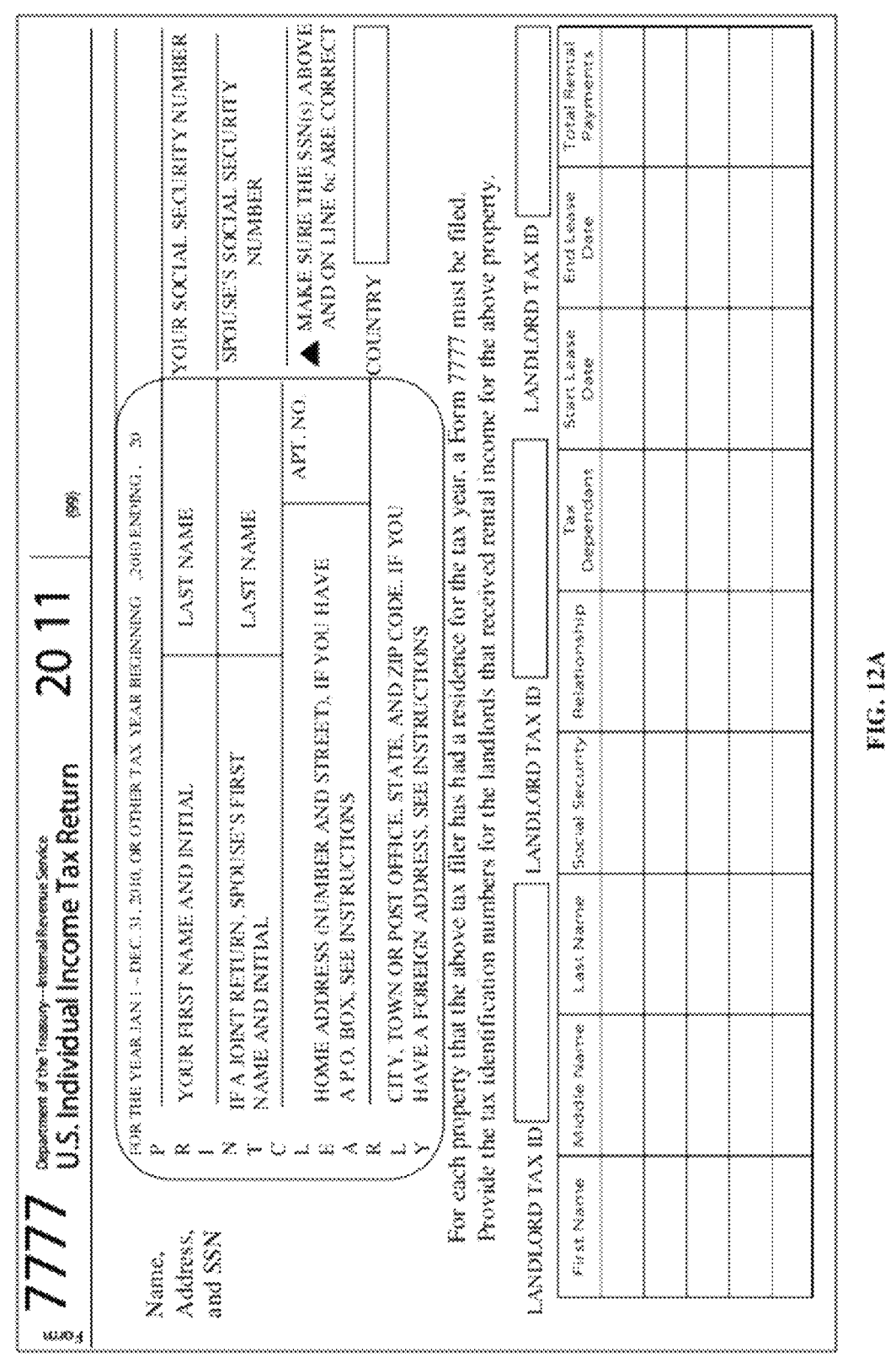

FIGS. 12A-12B exemplarily illustrate tax forms generated by the tax monitoring platform 601 exemplarily illustrated in FIG. 6, for a taxable entity 606b utilizing a property for reporting the personal information of the taxable entity 606b, information on taxable entities 606 associated with the taxable entity 606b, and the transaction details associated with the property. The taxable entity 606b is, for example, a tenant residing in a leased residence on the property. The tax form exemplarily illustrated in FIG. 12A generated by the tax monitoring platform 601 comprises fields for entering the unique identification information, for example, the tax identification numbers of the owners of the property, the names of the residents sharing the leased residence with the tenant, the unique identification information, for example, the social security numbers of the residents, the relationship between the tenant and the residents, the start date of lease and the end date of lease of the leased residence, and the total rental payments rendered by each individual resident of the leased residence. FIG. 12B exemplarily illustrates a tax form generated by the tax monitoring platform 601 for a taxable entity 606b, for example, a tenant on a property, that comprises fields for reporting the personal information of the taxable entity 606b, for example, the name, address, marital status, data of birth, address, unique identification information, gross monthly income, the employer information, etc., of the taxable entity 606b. The tax form exemplarily illustrated in FIG. 12B further comprises fields for reporting the owner of the property, monthly rent paid, personal information of a second taxable entity 606b, for example, a person residing with the tenant, etc.

Figure 13A:
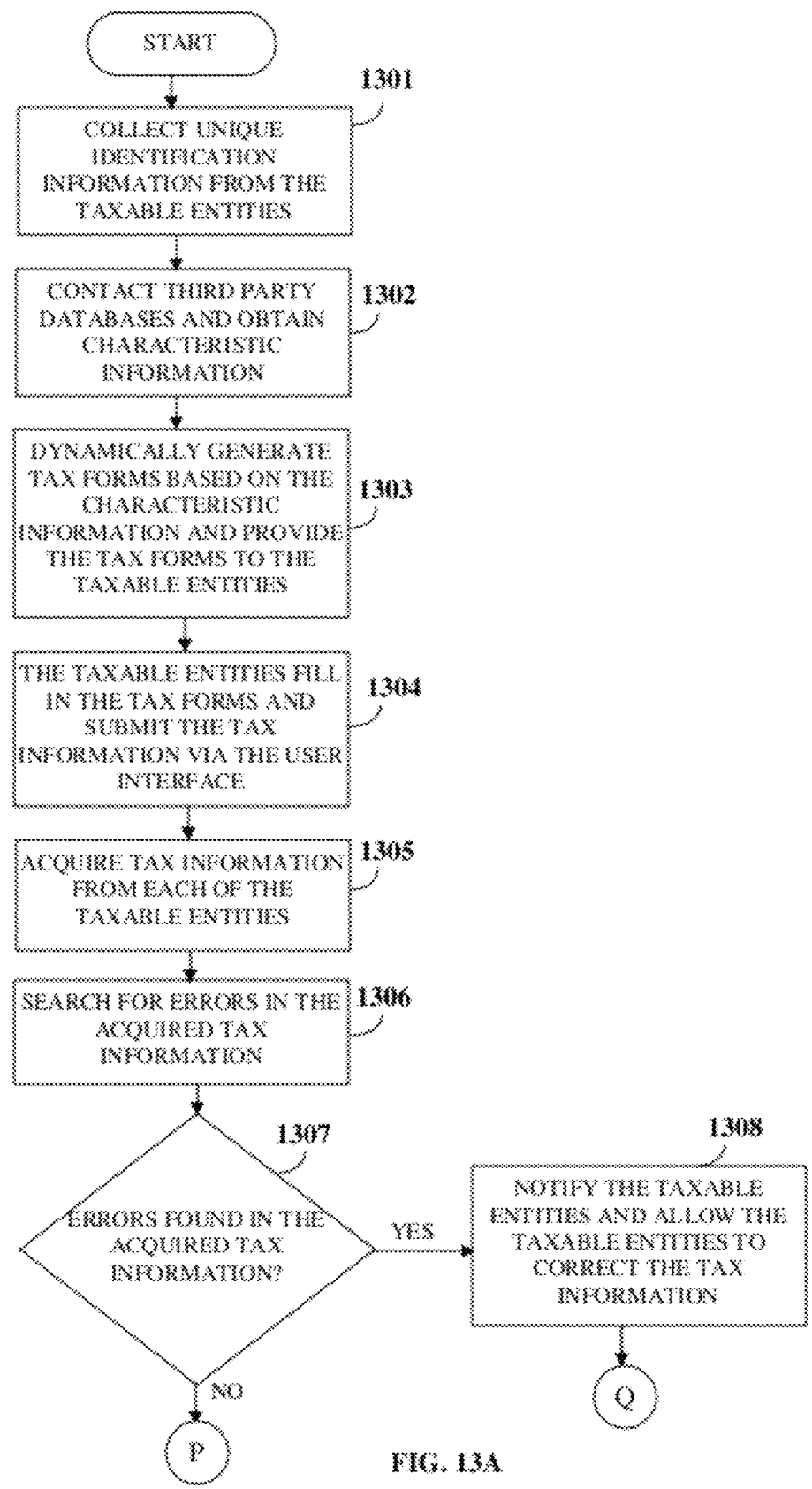
FIGS. 13A-13C exemplarily illustrate a flowchart comprising the steps for verifying tax liability and tax deductions reported by taxable entities.
Figure 13B:
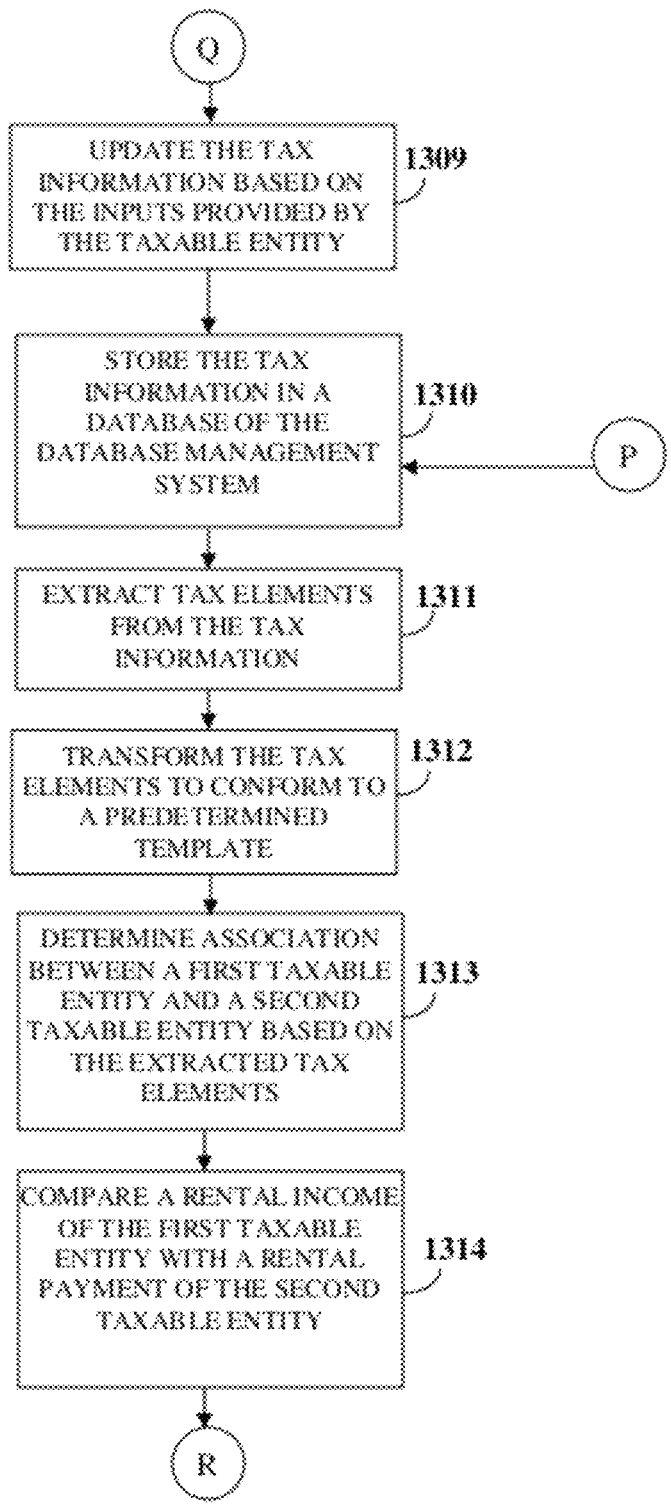
Figure 13C:
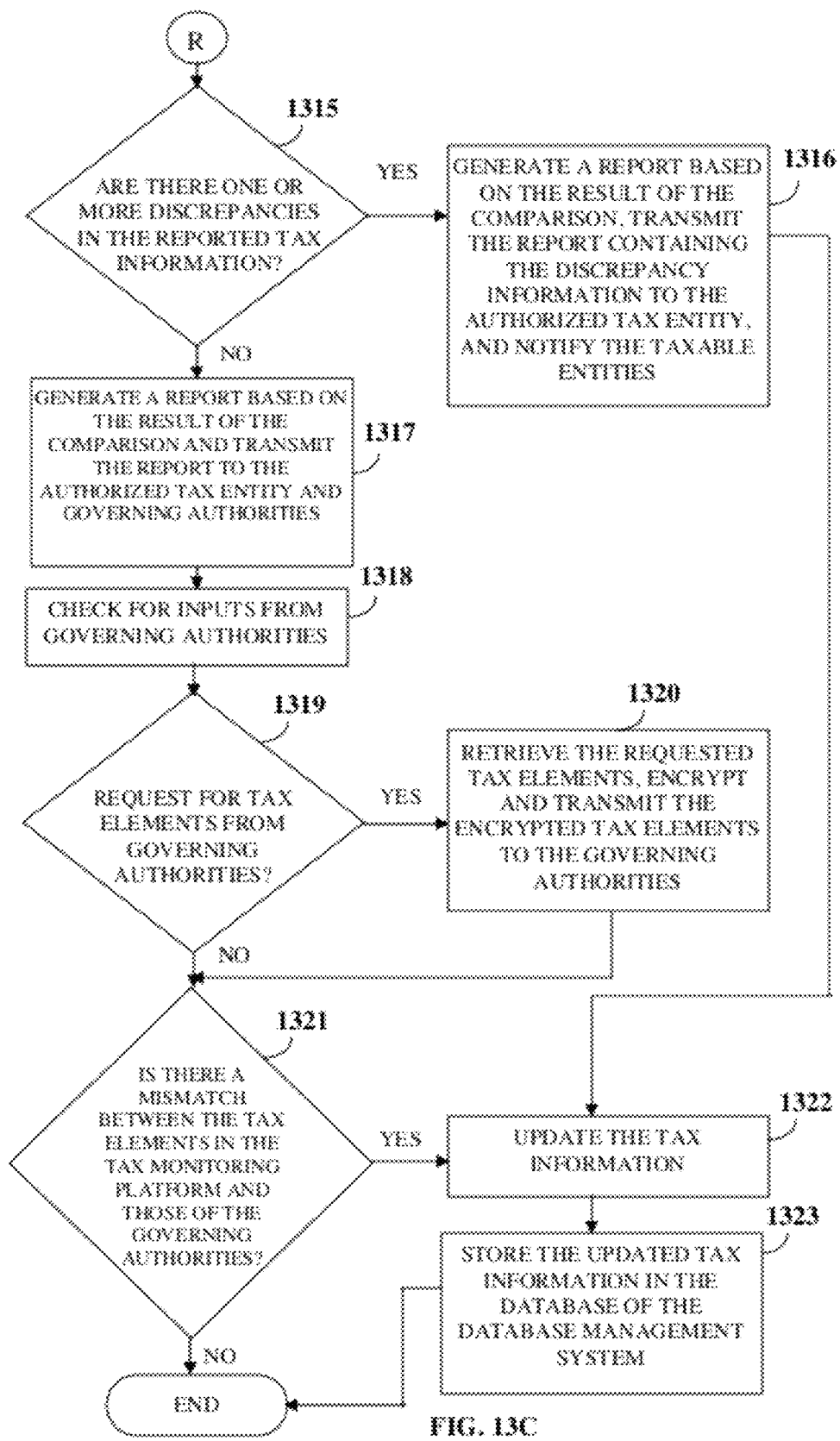

FIGS. 13A-13C exemplarily illustrate a flowchart comprising the steps for verifying tax liability and tax deductions reported by taxable entities 606. Consider an example where two taxable entities 606a and 606b submit tax information to the tax monitoring platform 601 exemplarily illustrated in FIG. 6, for verification of tax liabilities and tax deductions reported by the taxable entities 606. The first taxable entity 606a is, for example, an owner of a taxable object such as a property. The second taxable entity 606b utilizes the taxable object and renders payments to the first taxable entity 606a.

The tax monitoring platform 601 collects 1301 unique identification information from the taxable entities 606, that is, the first taxable entity 606a and the second taxable entity 606b. The unique identification information in this example is the social security number or the individual taxpayer identification numbers of the taxable entities 606. The tax monitoring platform 601 contacts 1302 third party databases and uses the social security numbers provided by the taxable entities 606 to obtain the characteristic information of the first taxable entity 606a and the second taxable entity 606b. The third party databases, in this example, comprise a tenancy database, a landlords' database, and a registered identification number database. The tax monitoring platform 601 maintains an agreement with the third party databases that allows the tax monitoring platform 601 to retrieve the characteristic information of the taxable entities 606. The tax monitoring platform 601 contacts the third party databases and determines that the first taxable entity 606a is a registered owner of the property "P1", and the second taxable entity 606b is a registered tenant who resides in a leased residence, for example, an apartment on the property "P1".

The tax monitoring platform 601 dynamically generates 1303 tax forms based on the characteristic information of the taxable entities 606. In this example, the tax monitoring platform 601 generates a separate tax form "T1" for the first taxable entity 606a who is the property owner "L1", and a separate tax form "T2" for the second taxable entity 606b "R1" who is the tenant residing in the apartment on the property "P1". The tax form T1 comprises fields for entering the total rental income earned from the property "P1", the number of tenants residing in the apartment, the rental income earned from each of the tenants residing in the apartment, the start date of lease of the apartment, the expected end date of lease of the apartment, etc. The tax form T2 comprises fields for entering the rental payment made to the property owner L1, the individual rental payments made by each resident of the apartment to the property owner L1, the relationship between the tenant R1 and the other residents of the apartment, the start date of lease and the expected end date of lease, etc. In this example, the tax monitoring platform 601 provides the generated tax forms as online tax forms to the taxable entities 606 via the user interface 601j. The taxable entities 606 fill 1304 in the online tax forms with the tax information, and submit the tax information to the tax monitoring platform 601 via the user interface 601j.

The tax monitoring platform 601 acquires 1305 the tax information from each of the taxable entities 606. The tax monitoring platform 601 searches 1306 for errors in the acquired tax information by comparing the individual elements of the tax information against the allowed ranges of values. The tax monitoring platform 601 checks 1307 whether errors have been found in the acquired tax information. If errors have been found in the acquired tax information, the tax monitoring platform 601 notifies 1308 the taxable entities 606 and allows the taxable entities 606 to correct the tax information via the user interface 601j. If errors have not been found in the acquired tax information, the tax monitoring platform 601 stores 1310 the tax information in the database 601c of the database management system 601b. In this example, the tax monitoring platform 601 determines that the start date of lease reported by the first taxable entity 606a L1 is an invalid date and notifies the first taxable entity 606a L1 to correct the start date of lease. The tax monitoring platform 601 updates 1309 the tax information of the first taxable entity 606a L1 in the database 601c of the database management system 601b, based on the inputs, that is, the corrected lease date provided by the first taxable entity 606a L1.

The tax monitoring platform 601 stores 1310 the updated tax information in the database 601c of the database management system 601b. The tax information comprises the personal identification information of the taxable entities 606, and information on the taxable object, in this example, the property, and tax liabilities and tax deductions claimed on the property. The tax monitoring platform 601 extracts 1311 tax elements from the acquired tax information. The tax elements extracted from the tax information submitted by the property owner L1 comprise the unique identification information of the property owner L1, for example, a tax identification number of the property owner, the rental income earned by the property owner, property identification information, a start date of lease, an expected end date of lease, etc. The tax elements extracted from the tax information submitted by the tenant comprise, for example, the tax identification number of the tenant, the rental payment submitted by the tenant, etc. The tax monitoring platform 601 transforms 1312 the extracted tax elements to conform to a predetermined template configured by the database management system 601b. In this example, the tax monitoring platform 601 formats the tax elements to map the tax elements to a logical data format defined by the database management system 601b.

The tax monitoring platform 601 determines 1313 an association between the first taxable entity 606a, that is, the property owner L1 and the second taxable entity 606b, that is, the tenant R1 based on the extracted tax elements. In this example, the tax monitoring platform 601 checks the unique identification information of the taxable entities 606 and the taxable object and the reference period. The tax monitoring platform 601 checks for a match between the property identification information, the tax year information, and the tax identification information submitted by the property owner L1 and the tenant R1. On finding a match, the tax monitoring platform 601 establishes an association between the property owner L1 and the tenant R1.

The tax monitoring platform 601 compares 1314 the rental income reported by the property owner L1 with the rental payment reported by the tenant R1. The tax monitoring platform 601 checks the total rental income reported by the property owner L1 with the sum of the individual rental payments rendered by each of the residents of the apartment as reported by the tenant R1. Consider for example that R1 specifies the names and tax identification numbers of residents R2, R3, and R4, who share the apartment with R1. R1 specifies that R2 and R4 are dependants of R1 and do not contribute to the rental payment for the apartment, and R3 contributes a rental payment of $3000. The rental payment reported individually by R1 is $2000. The tax monitoring platform 601 verifies whether the property owner L1 has reported each resident R1, R2, R3, and R4 residing in the apartment on the property P1, the individual rental incomes from R1 and R3, and whether the total rental income reported by the property owner L1 is equal to $5000.

The tax monitoring platform 601 checks 1315 whether one or more discrepancies were found in the reported tax information. For example, if the total rental payment from the residents R1, R2, R3, and R4 on the property P1 is greater than the total rental income reported by the property owner L1, or if the total rental payment from the residents R1, R2, R3, and R4 on the property P1 is lesser than the total rental income reported by the property owner L1, the tax monitoring platform 601 records a discrepancy against R1, R2, R3, R4, and L1. If the total rental payment from the residents R1, R2, R3, and R4 on the property P1 is exactly equal to the total rental income reported by the property owner L1, the tax monitoring platform 601 determines that there is no discrepancy in the reported tax information. If there are discrepancies found in the reported tax information, the tax monitoring platform 601 generates a discrepancy report based on the result of the comparison, records the discrepancy information in the discrepancy report, and transmits 1316 the discrepancy report to an authorized tax entity 605, for example, an auditor. Further, the tax monitoring platform 601 notifies the taxable entities 606, for example, through an electronic mail that discrepancies were found in the tax information and that further tax verification processing would not continue until accurate tax information was provided. The tax monitoring platform 601 checks if the taxable entities 606 have requested to update the tax information in order to correct the discrepancies. The tax monitoring platform 601 allows the taxable entities 606 to update 1322 the tax information to correct the discrepancies.

If there are no discrepancies found in the reported tax information, the tax monitoring platform 601 generates 1317 a report based on the result of the comparison and transmits the generated report to the authorized tax entity 605 and/or governing authorities 604. The authorized tax entity 605 in this example is an auditor and the governing authorities 604 comprise a government operated revenue service organization.

The tax monitoring platform 601 checks 1318 for inputs from governing authorities 604. The tax monitoring platform 601 checks 1319 whether a request for specific tax elements has been received from governing authorities 604. If a request has been made for specific tax elements, the tax monitoring platform 601 retrieves 1320 the requested tax elements from the database management system 601b, encrypts the retrieved tax elements and transmits the encrypted tax elements to the governing authorities 604. In this example, the tax monitoring platform 601 receives a request for specific tax elements of the taxable entities 606 from a census bureau. The census bureau requests the gross income of taxable entities 606 and the social security numbers of the taxable entities 606 to verify the number of citizens who earn an income above a predetermined income limit. The tax monitoring platform 601 encrypts the requested tax elements and transmits the encrypted tax elements to the census bureau. The governing authorities 604 may examine the received tax elements, and cross verify the values of the tax elements with the databases of the governing authorities 604 to determine if there are any discrepancies in the databases of the governing authorities 604. The governing authorities 604 may determine discrepancies in the tax information acquired by the tax monitoring platform 601, and notify the discrepancies to the tax monitoring platform 601.

The tax monitoring platform 601 checks 1321 whether the governing authorities 604 have reported a mismatch between the tax elements received from the tax monitoring platform 601 and the tax elements stored in the databases of the governing authorities 604. The tax monitoring platform 601 updates 1322 the tax information according to the inputs received from the taxable entities 606 and the governing authorities 604 and stores 1323 the updated tax information in the database 601c of the database management system 601b.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

Where databases are described such as the database 601c, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by the tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for verifying tax liability and tax deductions received from a landlord and one or more tenants, comprising:

providing a tax monitoring platform comprising a database management system for storing, managing, and retrieving information on said tax liability and said tax deductions received from said landlord and said one or more tenants, wherein said tax monitoring platform is accessible over a network, via a user interface provided by said tax monitoring platform;

dynamically generating one or more tax forms specific to said landlord and each of said one or more tenants based on characteristic information of said landlord and each of said one or more tenants, by said tax monitoring platform, wherein said dynamic generation of said one or more specific tax forms for said landlord and said one or more tenants comprises retrieving said characteristic information of said landlord and said one or more tenants from one or more of a plurality of third party databases by said tax monitoring platform via said network;

acquiring, by said tax monitoring platform, tax information of said landlord and said one or more tenants filled into said dynamically generated one or more tax forms via said user interface, wherein acquiring tax information of said landlord and said one or more tenants comprises:

determining tax information of said landlord in said acquired tax information filled into said dynamically generated one or more tax forms, wherein said tax information of said landlord comprises an identification information to uniquely identify a rental property, a unique identification information of said each of said one or more tenants, an amount of rental income received from said each of said one or more tenants for said rental property owned by said landlord; and determining tax information of said one or more tenants in said acquired tax information filled into said dynamically generated one or more tax forms, wherein said tax information of said one or more tenants comprises determining information on a number of individual residents sharing a leased residence, a relationship between said one or more tenants and said individual residents, a relationship between said landlord and said one or more tenants, a number and a unique identification information of said individual residents contributing to rental payment;

identifying errors in said acquired tax information, notifying one or more of said landlord and said one or more tenants to correct said errors via said user interface, updating said acquired tax information based on corrections received from said landlord and said one or more tenants, and storing said updated information in a database of said database management system, by said tax monitoring platform;

extracting tax elements from said acquired tax information by said tax monitoring platform and transforming said extracted tax elements to conform to a predetermined template defined by said database management system;

determining an association between said landlord and said one or more tenants based on said extracted tax elements of each of said landlord and said one or more tenants by said tax monitoring platform using said database management system;

comparing said extracted tax elements of said landlord with said extracted tax elements of said one or more tenants based on said association determined by said tax monitoring platform using said database management system, for determining accuracy of said tax information received from said landlord and said one or more tenants; and generating a report based on said comparison that determines said accuracy of said received tax information, transmitting said generated report to one or more of an authorized tax entity and governing authorities via said network, and updating said tax information of said landlord and said one or more tenants based on feedback received from said one or more of said authorized tax entity and said governing authorities via said network, by said tax monitoring platform;

whereby said determination of accuracy of said tax information received from said landlord and said one or more tenants verifies said tax liability and said tax deductions received from said landlord and said one or more tenants.

2. The computer implemented method of claim 1, wherein said tax elements comprise one or more of a tax year, name of each of said landlord and said one or more tenants, address of each of said taxable landlord and said one or more tenants, income associated with each of said landlord and said one or more tenants, number of said one or more tenants associated with said landlord, and transaction information associated with said rental property utilized by each of said landlord and said one or more tenants.

3. The computer implemented method of claim 1, wherein said tax monitoring platform compares said amount of rental income earned by said landlord on said rental property owned by said landlord with said rental payment rendered by said one or more tenants for utilization of said rental property using said database management system, for:
    verifying said rendered rental payment reported by said each of said one or more tenants with said amount of rental income reported by said landlord for said each of said one or more tenants; and
    verifying an equivalence of sum of said rendered rental payment reported by said each of said one or more tenants with a sum of said amount of rental income reported by said landlord for said each of said one or more tenants.

4. The computer implemented method of claim 1, wherein said comparison of said extracted tax elements of said landlord with said extracted tax elements of said one or more tenants based on said association determined by said tax monitoring platform using said database management system identifies discrepancies in said acquired tax information.

5. The computer implemented method of claim 1, further comprising transmitting unique identification information of said landlord and said one or more tenants, extracted from said acquired tax information stored in said database management system by said tax monitoring platform to a census authority via said network for enabling said census authority to perform a population count operation.

6. The computer implemented method of claim 1, wherein said predetermined template defined by said database management system is configured for organizing said tax elements extracted from said acquired tax information of said landlord and said one or more tenants in said database management system, enabling said determination of said association between said landlord and said one or more tenants, and performing automated retrieval of said tax elements from said database management system.

7. The computer implemented method of claim 1, further comprising:
    receiving requests for one or more tax elements extracted from said acquired tax information, from one or more governing authorities by said tax monitoring platform via said network;
    retrieving said one or more tax elements from said database management system by said tax monitoring platform; and
    replicating said retrieved one or more tax elements to one or more external databases associated with said one or more governing authorities by said tax monitoring platform via said network.

8. The computer implemented method of claim 7, wherein said tax monitoring platform encrypts said retrieved one or more tax elements and transmits said encrypted one or more tax elements to said one or more governing authorities via said network.

9. A computer implemented system for verifying tax liability and tax deductions received from a landlord and one or more tenants, comprising:
    a server configured to host a tax monitoring platform accessible by said landlord and said one or more tenants over a network, via a user interface provided by said tax monitoring platform, wherein said tax monitoring platform comprises:
    a database management system configured to store, manage, and retrieve information on said tax liability and said tax deductions received from said landlord and said one or more tenants;
    a tax form generation module configured to dynamically generate one or more tax forms specific to each of said landlord and said one or more tenants based on characteristic information of said landlord and said one or more tenants retrieved from a plurality of third party databases via said network;
    an information acquisition module configured to acquire tax information of said landlord and said one or more tenants, filled into said dynamically generated one or more tax forms via said user interface, and store said acquired tax information in said database management system, wherein said information acquisition module is further configured to:
        determine tax information of said landlord in said acquired tax information filled into said dynamically generated one or more tax forms, wherein said tax information of said landlord comprises an identification information to uniquely identify a rental property, a unique identification information of each of said one or more tenants, an amount of rental income received from said each of said one or more tenants for said rental property owned by said landlord; and
        determine tax information of said one or more tenants in said acquired tax information filled into said dynamically generated one or more tax forms, wherein said tax information of said one or more tenants comprises determining information on a number of individual residents sharing a leased residence, a relationship between said one or more tenants and said individual residents, a relationship between said landlord and said one or more tenants, a number and a unique identification information of said individual residents contributing to rental payment;
    an extraction module configured to extract tax elements from said acquired tax information;
    a processing module configured to identify errors in said acquired tax information, notify one or more of said landlord and said one or more tenants to correct said errors via said user interface, update said acquired tax information based on corrections received from said landlord and said one or more tenants, store said updated information in a database of said database management system, and transform said extracted tax elements to conform to a predetermined template defined by said database management system;
    a comparison module configured to determine an association between said landlord and said one or more tenants based on said extracted tax elements of each of said landlord and said one or more tenants, and compare said extracted tax elements of said landlord with said extracted tax elements of said one or more tenants based on said determined association, using said database management system for determining accuracy of said tax information received from said landlord and said one or more tenants to verify said tax liability and said tax deductions of said landlord and said one or more tenants; and
    a report generation module configured to generate a report based on said comparison that determines said accuracy of said received tax information, transmit said generated report to one or more of an authorized tax entity and governing authorities via said network, and update said tax information of said landlord and said one or more tenants based on feedback received from said one or more of said authorized tax entity and said governing authorities via said network.

10. The computer implemented system of claim 9, wherein said report generation module in communication with said information acquisition module is further configured to update said generated report based on discrepancy information acquired externally from said one or more of said authorized tax entity and said governing authorities by said information acquisition module via said network, and transmits said updated report to said one or more of said authorized tax entity and said governing authorities.

11. The computer implemented system of claim 9, wherein said extraction module is configured to extract unique identification information of said landlord or said one or more tenants from said acquired tax information stored in said database management system and transmits said extracted unique identification information to a census authority via said network for enabling said census authority to perform a population count operation.

12. The computer implemented system of claim 9, wherein said comparison module is configured to compare an amount of rental income earned by said landlord on said rental property owned by said landlord with said rental payment rendered by said one or more tenants for utilization of said rental property using said database management system for:
   verifying said rendered rental payment reported by each of said one or more tenants with said amount of rental income reported by said landlord for said each of said one or more tenants; and
   verifying an equivalence of sum of said rendered rental payment reported by said each of said one or more tenants with a sum of said amount of rental income reported by said landlord for said each of said one or more tenants.

13. The computer implemented system of claim 9, wherein said comparison module is configured to identify discrepancies in said acquired tax information during said comparison of said extracted tax elements of said landlord with said extracted tax elements of said one or more tenants based on said association using said database management system.

14. The computer implemented system of claim 9, wherein said information acquisition module is configured to update said tax information in said database management system on receipt of inputs from said landlord and said one or more tenants about change in said characteristic information via said user interface.

15. The computer implemented system of claim 9, wherein said database management system configures said predetermined template for organizing said tax elements extracted from said acquired tax information of said landlord and one or more tenants in said database management system, for enabling said comparison module to determine said association between said landlord and said one or more tenants, and for performing automated retrieval of said tax elements from said database management system.

16. The computer implemented system of claim 9, wherein said database management system retrieves one or more tax elements extracted from said acquired tax information based on requests for said one or more tax elements from one or more governing authorities via said network, and replicates said retrieved one or more tax elements to one or more external databases associated with said one or more governing authorities via said network.

17. The computer implemented system of claim 9, wherein said tax monitoring platform further comprises an encryption module configured to encrypt one or more of said tax elements extracted from said acquired tax information prior to transmitting said one or more tax elements to one or more governing authorities via said network.

18. A computer program product comprising computer executable instructions embodied in a non-transitory computer readable storage medium, wherein said computer program product comprises:

a first computer program code for enabling a tax monitoring platform comprising a database management system to store, manage, and retrieve information on tax liability and tax deductions received from a landlord and one or more tenants;

a second computer program code for dynamically generating one or more tax forms specific to each of said landlord and said one or more tenants based on characteristic information of said landlord and said one or more tenants, wherein said dynamic generation of said one or more specific tax forms for said landlord and said one or more tenants comprises retrieving said characteristic information of said landlord and said one or more tenants from one or more of a plurality of third party databases by said tax monitoring platform via said network;

a third computer program code for acquiring tax information of said landlord and said one or more tenants filled into said dynamically generated one or more tax forms via a user interface;

a fourth computer program code for determining tax information of said landlord in said acquired tax information filled into said dynamically generated one or more tax forms, wherein said tax information of said landlord comprises an identification information to uniquely identify a rental property, a unique identification information of each of said one or more tenants, an amount of rental income received from said each of said one or more tenants for said rental property owned by said landlord;

a fifth computer program code for determining tax information of said one or more tenants in said acquired tax information filled into said dynamically generated one or more tax forms, wherein said tax information of said one or more tenants comprises determining information on a number of individual residents sharing a leased residence, a relationship between said one or more tenants and said individual residents, a relationship between said landlord and said one or more tenants, a number and a unique identification information of said individual residents contributing to rental payment;

a sixth computer program code for identifying errors in said acquired tax information, notifying one or more of said landlord and said one or more tenants to correct said errors via said user interface, updating said acquired tax information on corrections received from said landlord and said one or more tenants, storing said updated information in a database of said database management system, and extracting tax elements from said acquired tax information and transforming said extracted tax elements to conform to a predetermined template defined by said database management system;

a seventh computer program code for determining an association between said landlord and said one or more tenants based on said extracted tax elements of each of said landlord and said one or more tenants using said database management system;

a eighth computer program code for comparing said extracted tax elements of said landlord with said extracted tax elements of said one or more tenants based on said determined association using said database management system, for determining accuracy of said tax information received from said landlord and said one or more tenants; and a ninth computer program code for generating a report based on said comparison that determines said accuracy of said received tax information, transmitting said generated report to one or more of an authorized tax entity and governing authorities via said network, and updating said tax information of said landlord and said one or more tenants based on feedback received from said one or more of said authorized tax entity and said governing authorities via said network, by said tax monitoring platform.

\* \* \* \* \*